United States Patent [19]

Born

[11] Patent Number: 5,588,506
[45] Date of Patent: Dec. 31, 1996

[54] AIRCRAFT MAINTENANCE ELEVATOR SYSTEM

[76] Inventor: Ray W. Born, 4211 W. 1st St., Space 21, Santa Ana, Calif. 92704

[21] Appl. No.: 276,044

[22] Filed: Jul. 14, 1994

[51] Int. Cl.⁶ ........................................ B66F 7/26
[52] U.S. Cl. .................... 187/209; 187/214; 187/216; 187/218; 187/268; 187/273; 187/394; 187/399; 254/89 R; 244/1 R
[58] Field of Search ........................ 187/394, 267, 187/268, 273, 399, 382, 209, 214, 216, 218; 254/45, 89 R; 244/1 R, 129.1; 414/426, 427, 430

[56] References Cited

U.S. PATENT DOCUMENTS

| | | | |
|---|---|---|---|
| 491,249 | 2/1893 | Reynolds | 187/267 X |
| 2,975,560 | 3/1961 | Leonard | 50/80 |
| 3,289,868 | 12/1966 | Miller et al. | 214/515 |
| 3,327,997 | 6/1967 | Zenke | 254/89 |
| 3,341,042 | 9/1967 | Carder | 214/512 |
| 3,489,297 | 1/1970 | McClain et al. | 214/16.1 |
| 3,831,713 | 8/1974 | Clarke | 187/8.41 |
| 4,124,191 | 11/1978 | Hofmann | 254/89 |
| 4,266,632 | 5/1981 | Yoneda et al. | 187/29 |
| 4,274,296 | 6/1981 | Miller et al. | 74/424.8 |
| 4,452,341 | 6/1984 | Tanahashi | 187/29 |
| 4,548,298 | 10/1985 | Born | 187/25 |
| 4,573,853 | 3/1986 | Lorenz | 414/460 |
| 4,661,749 | 4/1987 | Finkbeiner | 318/41 |
| 4,889,202 | 12/1989 | Born | 177/134 |

FOREIGN PATENT DOCUMENTS 137264  12/1947  Australia ........................... 187/267 X

*Primary Examiner*—William E. Terrell
*Assistant Examiner*—Dean A. Reichard
*Attorney, Agent, or Firm*—Stetina Brunda & Buyan

[57] ABSTRACT

An aircraft maintenance elevation system comprising a plurality of elevator platforms and a plurality of electro-mechanical drive assemblies which are coupled to and operable to selectively raise and lower respective ones of the elevator platforms. The elevation system further includes a control device which is electrically connected to the drive assemblies and is operational in a first mode wherein the elevator platforms may be raised and lowered independently of each other and a second mode wherein the elevator platforms may be simultaneously raised and lowered.

10 Claims, 24 Drawing Sheets

AIRCRAFT MAINTENANCE ELEVATOR SYSTEM

FIELD OF THE INVENTION

The present invention relates generally to elevators, and more particularly to an elevation system for facilitating the maintenance and servicing of large aircraft such as the BOEING 777 and 747, and AIRBUS 330.

BACKGROUND OF THE INVENTION

Systems for servicing and maintaining aircraft, especially large modern "heavy" aircraft such as wide-body jets, generally include landing gear maintenance elevators which operate in wells located in the maintenance hangar floor. Each maintenance elevator is constructed to support the weight of one of the landing gear trucks of the aircraft. Typically, the aircraft is wheeled into the maintenance hangar and oriented so that each of the landing gear trucks is supported by a respective one of the elevators. Thereafter, the elevators can be controllably raised and lowered to facilitate maintenance and repair of the landing gear trucks and other components of the aircraft, such as the engines.

Aircraft maintenance elevation systems as currently known in the prior art possess certain deficiencies which detract from their overall utility. Foremost of these deficiencies is the inability to simultaneously raise and lower the elevator platforms which are typically adapted only to be independently controlled. As will be recognized, due to the tremendous weight of the aircraft and need to maintain the same in a substantially level orientation during the raising and lowering thereof, the independently controlled elevators must be moved in succession in very small increments, thus making the lifting and lowering procedure both a lengthy and tedious process. Though U.S. Pat. No. 4,889,202 (issued to Born on Dec. 26, 1989) discloses an aircraft maintenance elevation system wherein the elevator platforms may be independently or simultaneously raised and lowered, the drive motors included in this system are not electrically connected to each other in a manner allowing the simultaneous control of the elevator platforms to be effected by a single remote control unit. Additionally, this as well as other prior art aircraft maintenance elevation systems do not include a monitoring system associated with each of the elevator platforms which compares the relative positions of the elevator platforms to each other during the simultaneous raising and lowering thereof for purposes of preventing any substantial misalignment between the elevator platforms (i.e., movement of the top surfaces of the platforms out of co-planar relation to each other).

A further deficiency associated with prior art aircraft maintenance elevation systems is the lack of an auxiliary drive system associated with each of the elevator platforms which facilitates the movement of a respective elevator platform back to floor level in the event of the failure of the primary drive motors. Also absent from prior art aircraft maintenance elevation systems are safety devices which function to immediately deactivate the drive motors of any elevator platform which shifts out of parallel relation to the floor line, or experiences a failure in any one of the machine screw actuators used to raise and lower the same. The present invention overcomes these and other deficiencies associated with prior art aircraft maintenance elevation systems.

SUMMARY OF THE INVENTION

In accordance with a preferred embodiment of the present invention, there is provided an aircraft maintenance elevation system comprising a plurality of elevator platforms. Each of the elevator platforms includes an electro-mechanical drive assembly coupled thereto which is operable to selectively raise and lower the same. Electrically connected to the drive assemblies is a control device which is operational in a first mode wherein the elevator platforms may be raised and lowered independently of each other, and a second mode wherein the elevator platforms may be simultaneously raised and lowered. In a first embodiment of the present invention, the elevation system includes right and left wing gear elevator platforms and a nose gear elevator platform. In a second embodiment of the present invention, the elevation system includes right and left wing gear elevator platforms, right and left body gear elevator platforms and a nose gear elevator platform. The system constructed in accordance with the second embodiment may further include right and left service elevator platforms.

Each of the drive assemblies preferably comprises a plurality of machine screw actuators which are attached to a respective one of the elevator platforms and mechanically synchronized to maintain the elevator platform level throughout the operational sequence thereof. Mechanically coupled to the machine screw actuators are the drive shafts of at least two reversible electric drive motors. The rotation of the drive shafts in a first direction causes the machine screw actuators to raise the elevator platform, with the rotation of the drive shafts in a second direction causing the machine screw actuators to lower the elevator platform. Each of the drive assemblies further comprises an auxiliary pneumatic drive system mechanically coupled to the machine screw actuators and operable to move the elevator platform to floor level upon the failure of either of the drive motors. In addition to the auxiliary pneumatic drive system, each of the drive assemblies includes an auxiliary manual electric drive system which is electrically connected to the drive motors for manually raising and lowering the elevator platform.

Each of the drive assemblies of the aircraft maintenance elevation system further comprises a platform position monitoring system which is mechanically coupled to at least one of the drive motors and operable to stop each of the drive motors when the elevator platform is at floor level, at a lower position limit below floor level, and an upper position above floor level. Attached to respective ones of the machine screw actuators of each drive assembly are a plurality of electro-mechanical safety switches which are electrically connected to the drive motors and operable to deactivate the drive motors upon the failure of any one of the machine screw actuators. Additionally, attached to each elevator platform and electrically connected to the drive motors of the respective drive assembly is a level detector which is operable to deactivate the drive motors upon the elevator platform shifting out of parallel relation to the floor line.

The control device of the aircraft maintenance elevation system comprises a central processor which is electrically connected to the drive motors and position monitoring system of each of the drive assemblies. In operation, each of the position monitoring systems continuously senses the position of a respective elevator platform and transmits an electrical signal representative of the elevator platform position to the central processor. The central processor is operable to compare the electrical signals generated by the position monitoring systems and transmit motor drive signals based on the relative positions of the elevator platforms which regulate the operation of the drive motors of each of the drive assemblies as needed to maintain the elevator platforms in substantially co-planar relation to each other during the raising and lowering thereof.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENTS

Figure 1:
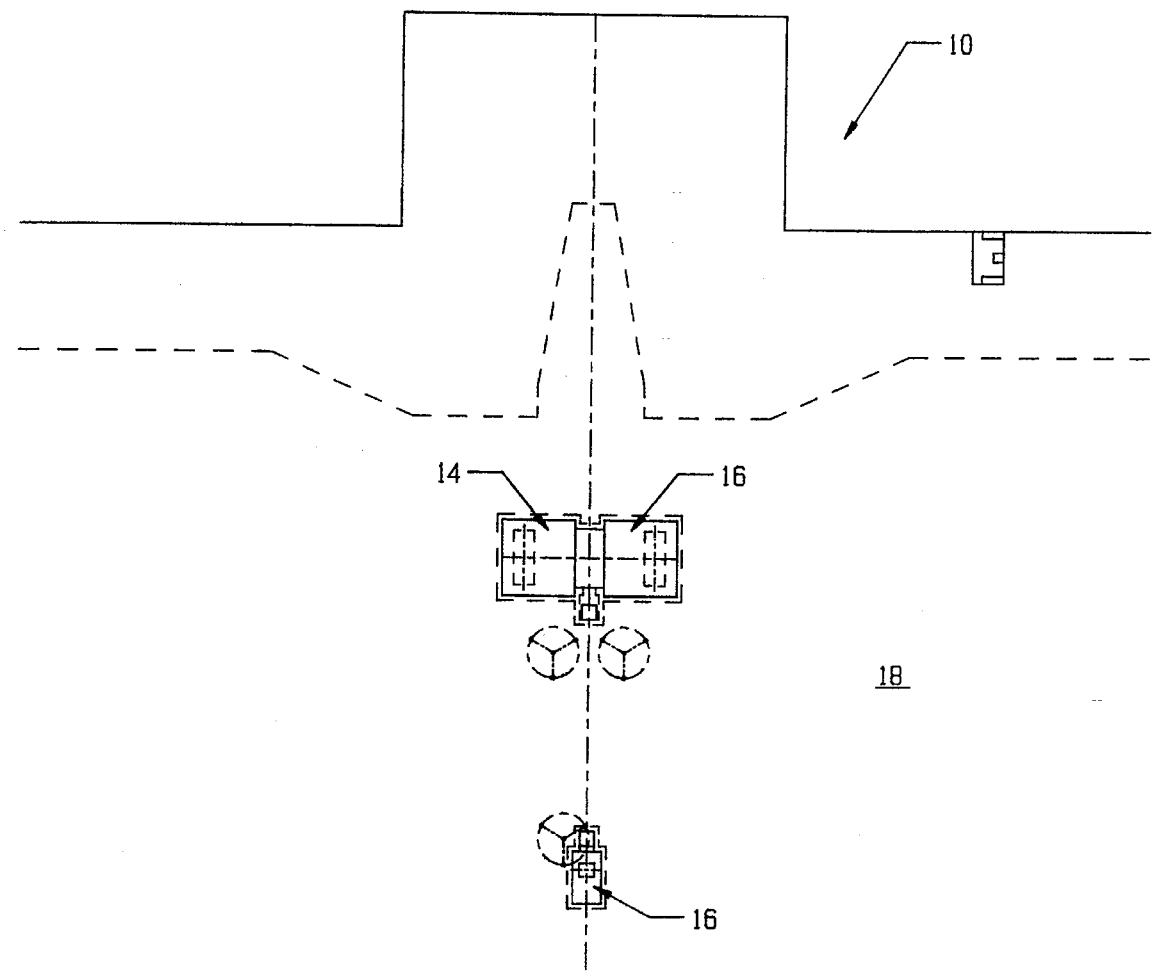
FIG. 1 is a top view of an aircraft maintenance elevation system constructed in accordance with a first embodiment of the present invention.

Referring now to the drawings wherein the showings are for purposes of illustrating preferred embodiments of the present invention only, and not for purposes of limiting the same, FIG. 1 is a top view of an aircraft maintenance elevation system 10 constructed in accordance with a first embodiment of the present invention. In the first embodiment, the elevation system 10 is designed to service the AIRBUS 330 and BOEING 777 aircrafts, as well as other similarly designed aircrafts. The purpose of the elevation system 10 is to provide a means of servicing the aforementioned aircrafts at near normal static height using standard fixed height docks and access stands, while having the advantage of being able to simultaneously service, cycle or remove the landing gear trucks from the aircraft while the other service is in progress. The elevation system 10 also provides the means to elevate the aircraft to jack height and to return the aircraft from jack height to floor level.

In the first embodiment, the elevation system 10 comprises a nose gear elevator platform 12, a left wing gear elevator platform 14 and a right wing gear elevator platform 16. Each of the elevator platforms 12, 14, 16 defines a planer top surface which is continuous with the floor 18 of the maintenance hanger when the aircraft is initially brought in for servicing. As will be discussed in more detail below, the elevation system 10 is operational in a first mode wherein the elevator platforms 12, 14, 16 may be controlled (i.e., raised and lowered) independently of each other, and a second, synchronized mode wherein they may be simultaneously raised and lowered.

As will be recognized, the layout of the elevator platforms 12, 14, 16 upon the floor 18 of the aircraft maintenance hanger coincides with the positions of the landing gear trucks upon aircraft such as the AIRBUS 330 and BOEING 777. The left and right wing gear elevator platforms 14, 16 are identically configured and have a preferred length of 21 feet and a preferred width of 20 feet. The total vertical travel capability of the left and right wing gear elevator platforms 14, 16 is 102⅜ inches, with 78¾ inches of such travel being below floor level and 23⅝ inches being above floor level. The load bearing capacity of the left and right wing gear elevator platforms 14, 16 is 70 tons on an operational basis and 110 tons on a rollover basis. The nose gear elevator platform 12 has a preferred length of 14 feet and a preferred width of 8 feet. Like the left and right wing gear elevator platforms 14, 16 previously described, the total vertical travel capability of the nose gear elevator platform 12 is 102⅜ inches, with 78¾ inches of such travel being below floor level and 23⅝ inches being above floor level. The load bearing capacity of the nose gear elevator platform 12 is 30 tons on an operational basis and 110 tons on a rollover basis. As previously indicated, the elevator platforms 12, 14, 16 are positioned to independently carry the weights exerted by the main landing gear trucks and nose gear truck of aircraft such as the AIRBUS 330 and BOEING 777.

Referring now to FIGS. 2–5a, each of the elevator platforms 12, 14, 16 is supported by a drive assembly 20 which is located in the bottom of a respective one of the elevator pits 22 associated with the elevator platforms. Each elevator pit 22 is sized to accommodate a respective elevator platform 12, 14, 16 such that it can be raised above or lowered below the floor level 18 of the maintenance area. As will be recognized, the raising and lowering of the elevator platforms 12, 14, 16 is accomplished by the drive assemblies 20 upon which they are supported.

Figure 7:
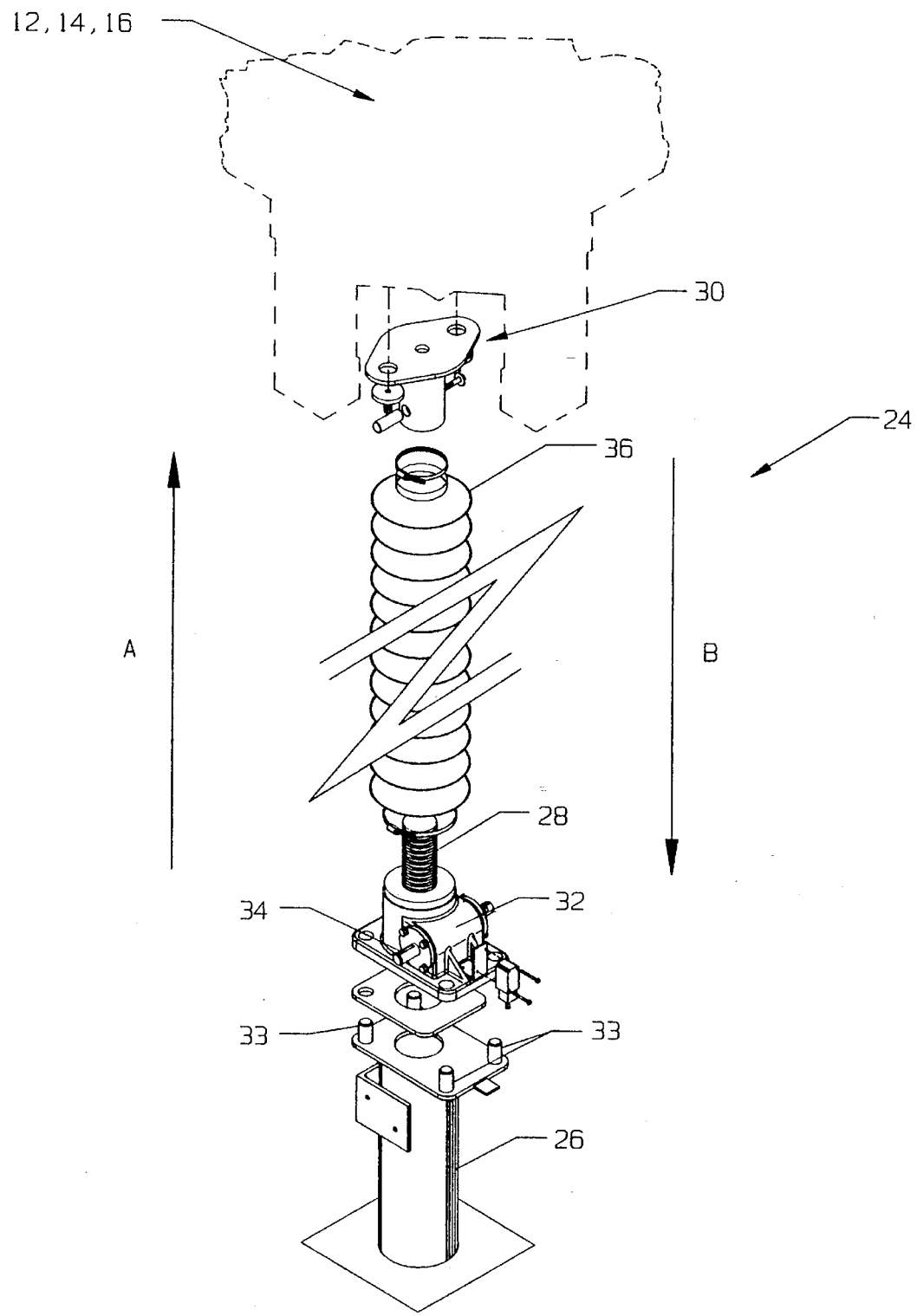
FIG. 7 is a perspective view of a machine screw actuator associated with each drive assembly.

The drive assemblies 20 associated with the left and right wing gear elevator platforms 14, 16 are identically configured and are mirror images of each other. Each of these drive assemblies 20 comprises six (6) machine screw actuators 24 which are arranged on the floor of a respective elevator pit 22 in two (2) rows which extend along opposite side walls of the elevator pit 22 in parallel relation, with each row including three (3) machine screw actuators 24. As best seen in FIG. 7, each machine screw actuator 24 comprises a base portion 26 having an elongate, externally threaded machine screw 28 rotatably engaged thereto. The top, distal end of the machine screw 28 is rigidly attached to a respective elevator platform 14, 16 via a retainer bracket 30. The machine screw 28 is also extended through and threadibly engaged to gear box 32 which is itself attached to the base portion 26. Extending from opposed sides of the gear box 32 is a actuation shaft 34. In operation, the rotation of the actuation shaft 34 in a first direction via an external source facilitates the upward vertical movement of the machine screw 28 and hence a respective elevator platform 14, 16 as indicated by the arrow A. Conversely, the rotation of the actuation shaft 34 in a second direction opposite the first direction facilitates the downward vertical movement of the machine screw 28 as indicated by the arrow B. The entire length of the machine screw 28 is preferably covered by a protective bellows 36 which is extensible and collapsible as the machine screw 28 moves upwardly and downwardly relative the gear box 32 and base portion 26. An example of a machine screw actuator 24 which may be utilized in conjunction with the elevation system 10 is sold by DUFF-NORTON as Model No. 9035.

Referring now to FIGS. 4, 4a, 5 and 5a, disposed between a respective pair of the machine screw actuators 24 of each row is a bevel drive gear box 38. In each row of machine screw actuators 24, disposed between the middle machine screw actuator 24 and the bevel drive gear box 38 is a large diameter gear belt pulley 40. Extending axially through the gear belt pulley 40 and rigidly maintained therewithin is a shaft 42, the opposed ends of which are extended through a pair of pillow blocks 44 disposed on opposite sides of the gear belt pulley 40. One end of the shaft 42 is attached to the bevel drive gear box 38 via a coupling 46. The opposite end of the shaft 42 is attached to the actuation shaft 34 of the middle machine screw actuator 24 via a first drive shaft 48. The actuation shaft 34 of the middle machine screw actuator 24 is itself attached to the actuation shaft 34 of the machine screw actuator 24 disposed furthest from the bevel drive gear box 38 via a second drive shaft 50. The actuation shaft 34 of the machine screw actuator 24 disposed closest to the bevel drive gear box 38 is attached thereto via a third drive shaft 52.

Attached to a support frame in close proximity to the gear belt pulley 40 is a reversible electric drive motor 54 having a drive shaft 56 extending axially therefrom. The drive motor 54 preferably comprises a 30 horsepower electric A/C motor such as that sold by MAGNETEK CENTURY under the Model No. 965149000. The drive shaft 56 of the drive motor 54 is operatively connected to the gear belt pulley 40 via a belt 58. In view of the cooperative engagement of the three (3) machine screw actuators 24 of the row to each other and the drive motor 54 in the aforementioned manner, the rotation of the drive shaft 56 in a first direction facilitates the upward vertical movement of the machine screws 28 in the direction A. Conversely, the rotation of the drive shaft 56 in a second direction (opposite the first direction) facilitates the downward vertical movement of the machine screws 28 in the direction B. As will be recognized, the machine screw actuators 24 included in the other row are operatively engaged to each other and to a drive motor 54 through the utilization of drive components identical to those previously described. In this respect, the machine screw actuators 24 of each row and their associated drive components are arranged in a respective elevator pit 22 as mirror images of each other, with one of the drive motors 54 of the drive assembly 20 selectively raising and lowering the machine screws 28 of one row of machine screw actuators 24, and the other drive motor 54 selectively raising and lowering the machine screws 28 of the other row of machine screw actuators 24.

To ensure the simultaneous upward and downward vertical movement of the machine screws 28 of all six machine screw actuators 24 (despite each row being driven by an independent drive motor 54), the bevel drive gear boxes 38 associated with the machine screw actuators 24 are operatively connected to each other. Such connection is facilitated by a first transverse shaft 62 which is connected to one of the bevel drive gear boxes 38, and a second transverse shaft 64 which is attached to the other bevel drive gear box 38. Attached to and extending between the distal ends of the first and second transverse shafts 62, 64 is a reduced diameter link shaft 66 which is supported by a pair of pillow blocks 68. Importantly, the operative engagement of the bevel drive gear boxes 38 of the drive assembly 20 to each other via the first and second transfer shafts 62, 64 and link shaft 66 ensures the synchronized movement of the machine screws 28 of all six machine screw actuators 24 upon the activation of the drive motors 54.

Figure 5:
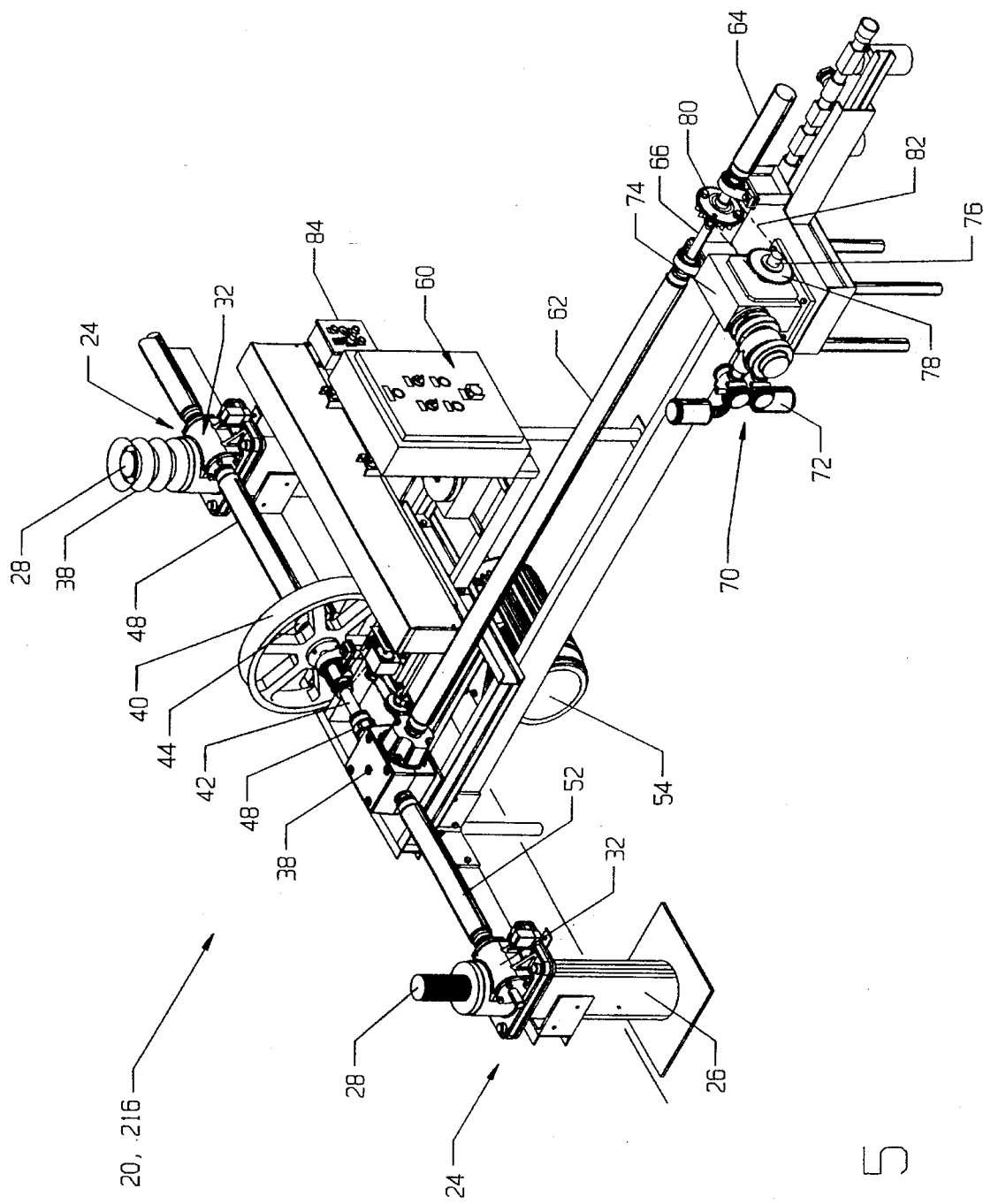
FIG. 5 is a partial perspective view of the drive assembly associated with each of the elevator platforms of the elevation systems constructed in accordance with the first and second embodiments.
Figure 5A:
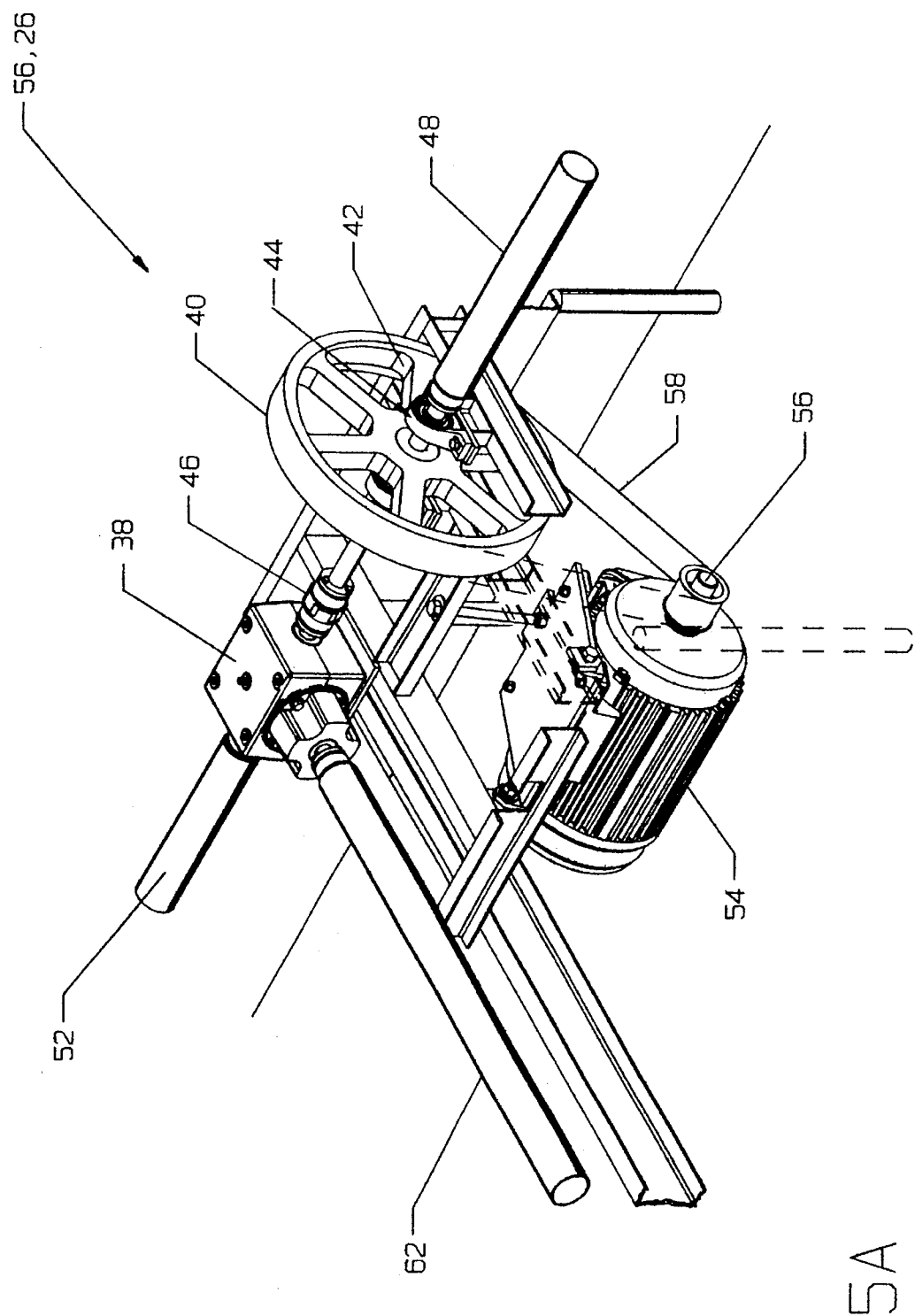
FIG. 5a is an enlarged view of the section of the drive assembly shown in FIG. 5.
Figure 5B:
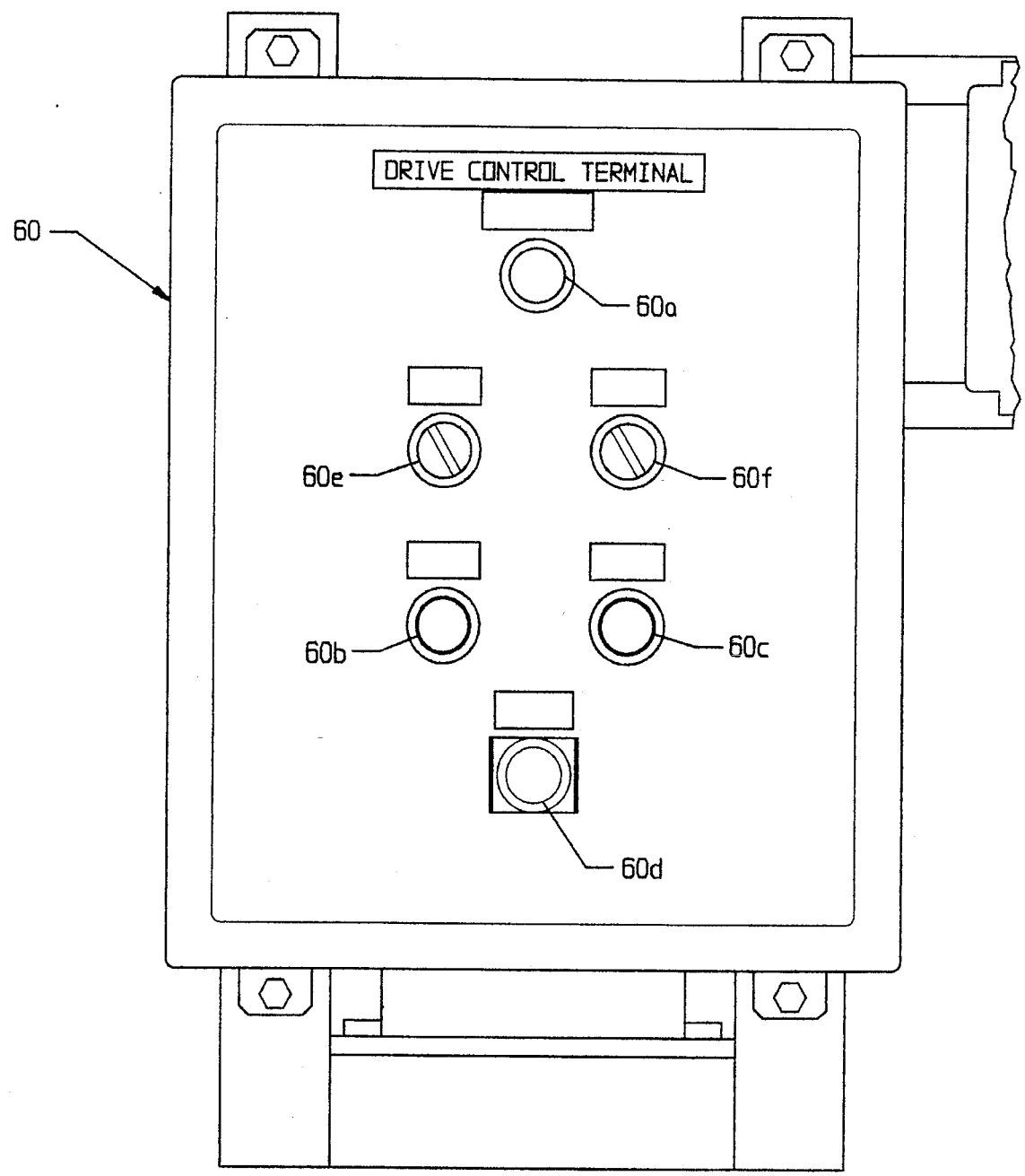
FIG. 5b is a front elevational view of the auxiliary manual electric drive system associated with each drive assembly.

Referring now to FIG. 5b, the drive assemblies 20 associated with the elevator platforms 14, 16 each include an auxiliary manual electric drive system which is housed within a drive control terminal 60 and electrically connected to the drive motors 54 of the drive assembly 20 for manually raising and lowering a respective elevator platform 14, 16. The drive control terminal 60 includes a start button 60a to initiate the manual control of the drive assembly 20. In addition to the start button 60a, the drive control terminal 60 includes a manual up button 60b and a manual down button 60c. As will be recognized, the actuation of the manual up button 60b facilitates the activation of the drive motors 54 in a manner causing the simultaneous upward vertical movement of the machine screws 28 of the machine screw actuators 24. Conversely, the actuation of the manual down button 60c facilitates the activation of the drive motors 54 in a manner causing the simultaneous downward vertical movement of the machine screws 28 of the machine screw actuators 24. The drive control terminal 60 further includes an emergency stop button 60*d* which, when pressed, immediately deactivates the drive motors 54. Also included are a bypass on/off button 60*e* and a radio manual button 60*f*, the use of which will be discussed below. The drive control terminal 60 is preferably located in close proximity to one of the drive motors 54 of the drive assembly 20.

Figures 8, 8A:
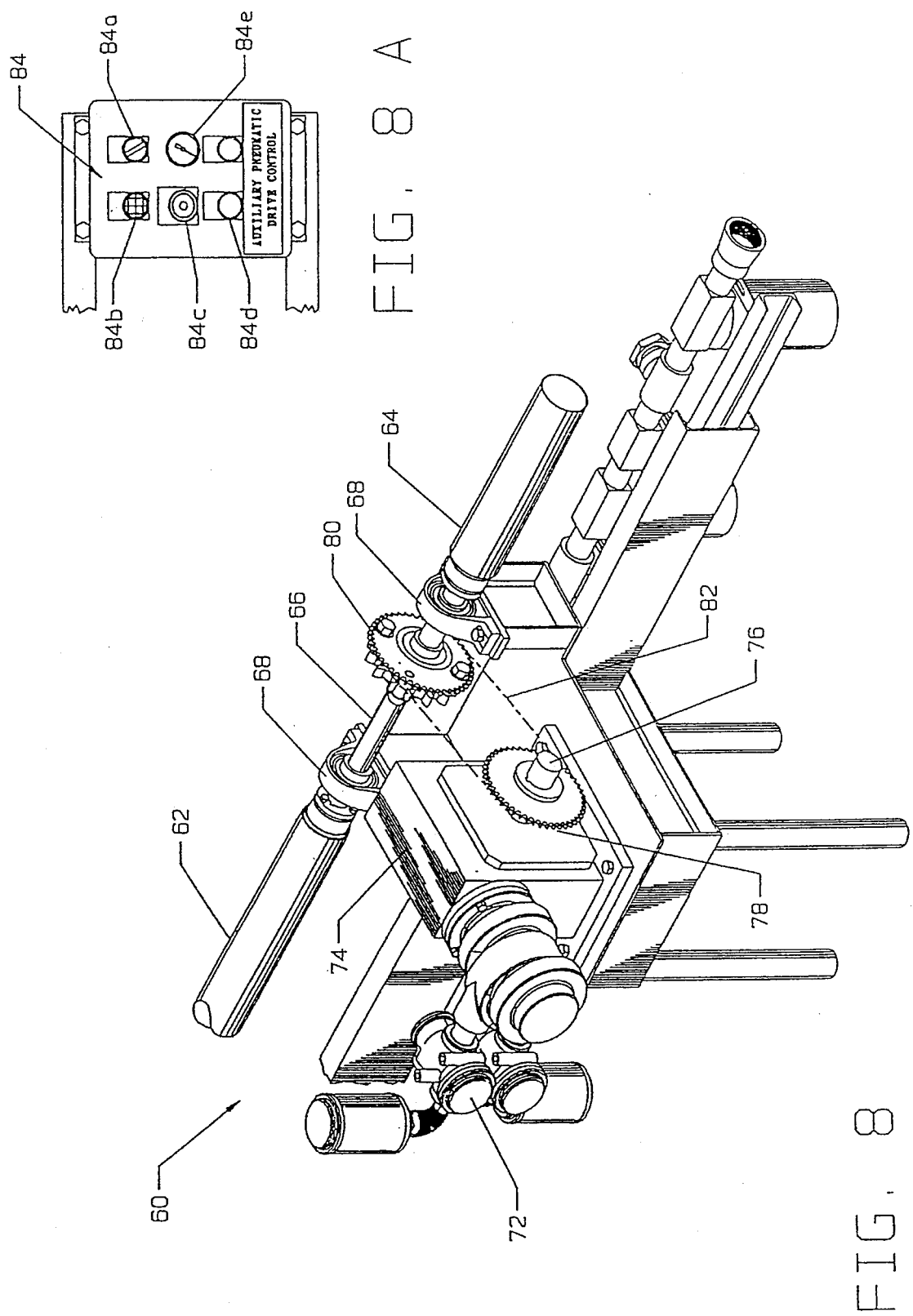
FIG. 8 is a perspective view of an auxiliary pneumatic drive system associated with each drive assembly.
FIG. 8a is a front elevation view of a drive control units for the auxiliary pneumatic drive system.

In addition to the drive motors 54, the drive assemblies 20 for the elevator platforms 14, 16 each preferably include an auxiliary pneumatic drive system 70 which is operable to move a respective elevator platform 14, 16 upwardly or downwardly to floor level upon the failure of either of the drive motors 54 of its associated drive assembly 20. As best seen in FIGS. 5 and 8, the auxiliary pneumatic drive system 70 preferably comprises an air motor 72 which is cooperatively engaged to a worm gear reducer 74 having an output shaft 76 extending therefrom. Disposed on the output shaft 76 is a first sprocket 78 which is itself cooperatively engaged to a second sprocket 80 positioned on the link shaft 66 via a chain 82. Due to the coupling of the auxiliary pneumatic drive system 70 to a portion of the linkage interconnecting the bevel drive gear boxes 38, the activation of the air motor 72 facilitates the simultaneous upward or downward vertical movement of the machine screws 28 of all six machine screw actuators 24, depending upon the direction of operation of the air motor 72.

The operation of the auxiliary pneumatic drive system 70 is controlled by a drive control unit 84 which is disposed immediately adjacent the drive control terminal 60 of the drive assembly 20. The drive control unit 84 includes an on/off switch 84*a* and a power indicator lamp 84*b*, as well as a motor speed control 84*c*. Additionally, the drive control unit 84 includes an up button 84*d* and a down button 84*e*. As will be recognized, the actuation of the up button 84*d* facilitates the activation of the auxiliary pneumatic drive system 70, and in particular the air motor 72 thereof, in a manner causing the simultaneous upward vertical movement of machine screws 28 of machine screw actuators 24. Conversely, the actuation of the down button 84*e* facilitates the activation of the auxiliary pneumatic drive system 70 in a manner causing the simultaneous downward vertical movement of the machine screws 28 of the machine screw actuators 24.

Figure 6:
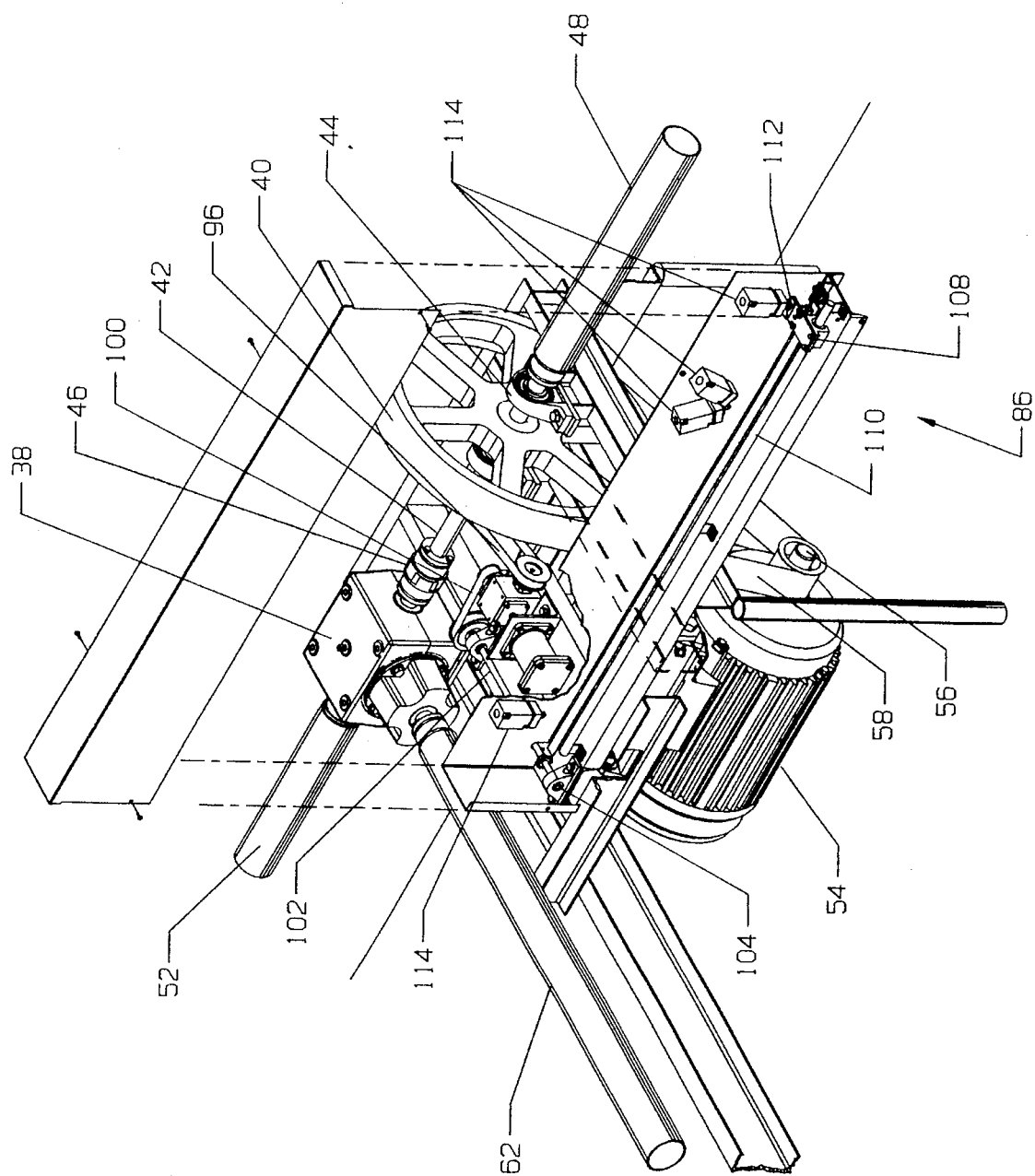
FIG. 6 is a perspective view of the platform position monitoring system associated with each drive assembly.
Figure 6A:
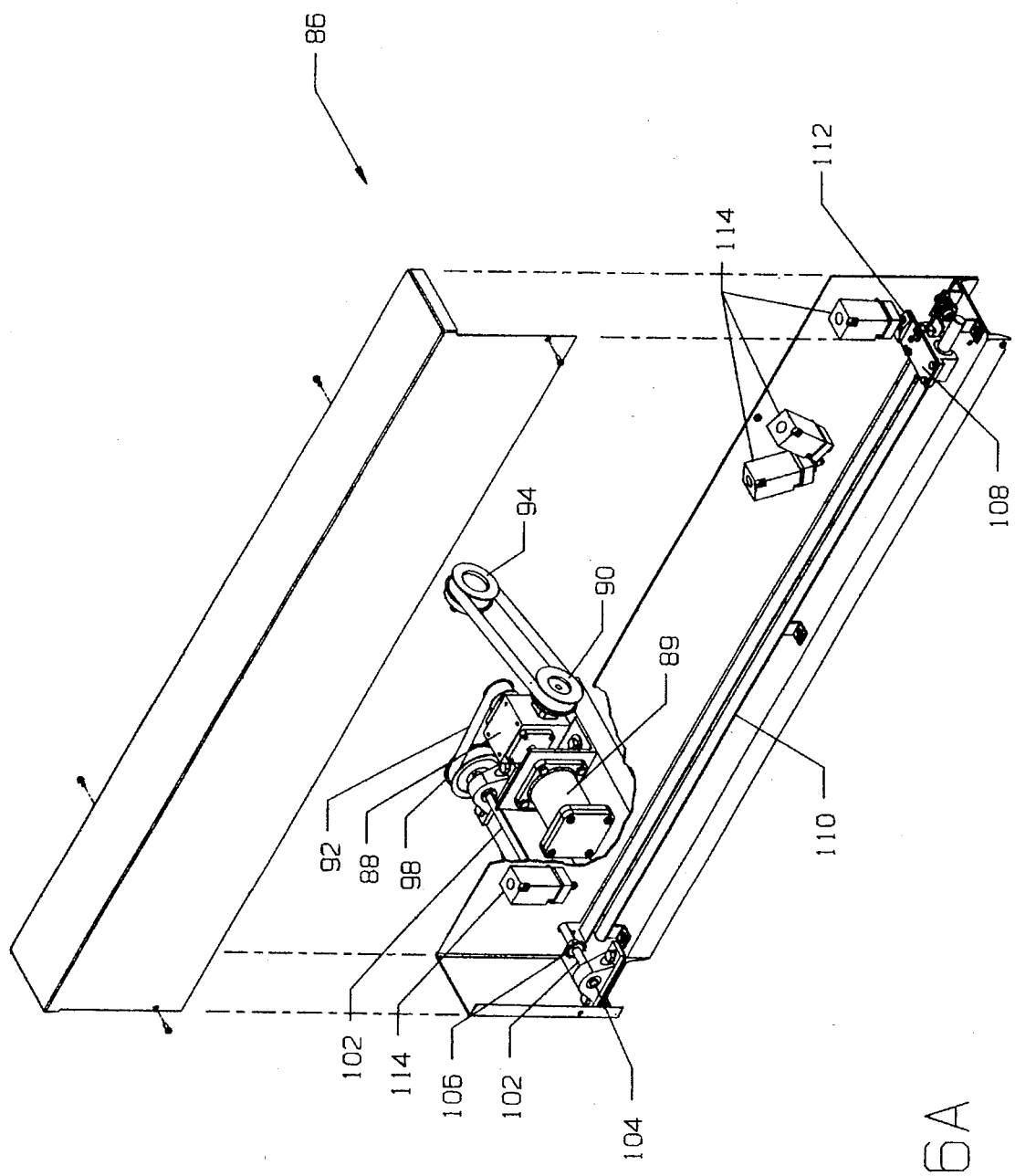
FIG. 6a is a perspective view of the platform position monitoring system shown in FIG. 6.

Referring now to FIGS. 6 and 6*a*, the drive assemblies 20 for the elevator platforms 14, 16 each further include a platform position monitoring system 86 which is operatively coupled to the shaft 42 of one of the two gear belt pulleys 40 of the drive assembly 20. As will be discussed in more detail below, the platform position monitoring system 86 is operable to sense the position of a respective elevator platform 14, 16 and stop the drive motors 54 when the elevator platform 14, 16 is at floor level, at a lower position limit below floor level, and at an upper position limit above floor level.

The platform position monitoring system 86 comprises a worm gear box 88 having a first gear belt pulley 90 and a first sprocket gear belt 92 connected to rotating shafts extending therefrom. Coupled to the worm gear box 88 is an optical encoder 89. The first gear belt pulley 90 is operatively coupled to a second gear belt pulley 94 positioned on one of the shafts 42 of the drive assembly 20 via a belt 96. The first sprocket gear belt 92 is itself operatively coupled to a second sprocket gear belt 98 via a belt 100. The second sprocket gear belt 98 is attached to one and of a drive shaft 102, the opposite end of which is disposed within a pillow block bearing 104. Positioned on the drive shaft 102 is a sprocket 106. The sprocket 106 is connected to a linear bearing 108 via a chain (not shown). The linear bearing 108 is slidably attached to and movable horizontally along an elongate guide bar 110. The rotation of the drive shaft 102 in a first direction causes the linear bearing 108 to be pulled by the chain along the guide bar 110 toward the sprocket 106. Conversely, the rotation of the drive shaft 102 in a second direction opposite the first direction causes the linear bearing 108 to be pulled by the chain along the guide bar 110 away from the sprocket 106. As will be recognized, the direction of rotation of the drive shaft 102 is a function of the direction of rotation of the second gear belt pulley 94 which is positioned on one of the shafts 42. In this respect, due to the connection of the second gear belt pulley 94 to the first gear belt pulley 90 via the belt 96 and the connection of the first sprocket gear belt 92 to the second sprocket gear belt 98 via the belt 100, the movement of the linear bearing 108 toward or away from the sprocket 106 is governed by the direction of rotation of the drive shafts 56 of the drive motors 54.

Attached to the linear bearing 108 is a cam 112 which is adapted to selectively actuate a plurality of limit switches 114 positioned at pre-selected locations along the length of the guide bar 110. In the platform position monitoring system 86, the rotation of the drive shafts 56 of the drive motors 54 in a manner facilitating the upward vertical movement of a respective elevator platform 14, 16 results in the simultaneous movement of the linear bearing 108, and hence the cam 112, away from the sprocket 106. Conversely, the rotation of the drive shafts 56 of the drive motors 54 in a manner facilitating the downward vertical movement of a respective elevator platform 14, 16 results in the movement of the cam 112 toward the sprocket 106. As such, the limit switch 114 disposed furthest from the sprocket 106 comprises an above-floor limit which, when actuated by the cam 112, deactivates the drive motors 54. Importantly, this limit switch 114 is positioned along the guide bar 110 so as to be tripped by the cam 112 when a respective elevator platform 14, 16 reaches a height of approximately 23⅝ inches above floor level. The limit switch 114 disposed closest the sprocket 106 comprises a below-floor limit which is oriented along the guide bar 110 so as to be actuated by the cam 112 when a respective elevator platform 14, 16 reaches a depth below the floor level of approximately 78¾ inches.

The limit switches 114 disposed intermediate the above and below floor limits are oriented along the guide bar 110 so as to be tripped by the cam 112 when a respective elevator platform 14, 16, and in particular the top surface thereof, is co-planar with the level of the floor 18. Of these two limit switches 114, the switch disposed closest to the below-floor limit is adapted to be actuated by the cam 112 and deactivate the drive motors 54 when a respective elevator platform 14, 16 reaches floor level while the elevation system 10 is in the manual control mode. The other switch of the pair which is disposed closest to the above-floor limit is adapted to be actuated by the cam 112 when a respective elevator platform 14, 16 reaches floor level while the elevation system 10 is in the simultaneous control mode. As previously explained, since the activation of the drive motors 54 of the drive assembly 20 causes the linear bearing 108, and hence the cam 112, to slide horizontally along the guide bar 110 (with the direction of movement being dependent upon the rotational direction of the drive shafts 56), the precise positioning of the limit switches 114 along the guide bar 110 allows the same to be selectively actuated by the cam 112 and deactivate the drive motors 54 when a respective elevator platform 14, 16 reaches particular positions at, above or below the level of the floor 18.

In addition to the platform position monitoring system 86 being adapted to establish below-floor, above-floor and floor level limits, the system is further adapted to continuously sense the position of a respective elevator platform 14, 16 relative the level of the floor 18. Such position sensing is accomplished by the optical encoder 89 which, as previously explained, is operatively coupled to the worm gear box 88 of the platform positioning monitoring system 86. As will be explained in more detail below, the optical encoder 89 is adapted to continuously transmit electrical signals representative of the position of a respective elevator platform 14, 16 throughout its range of vertical travel.

Figure 9:
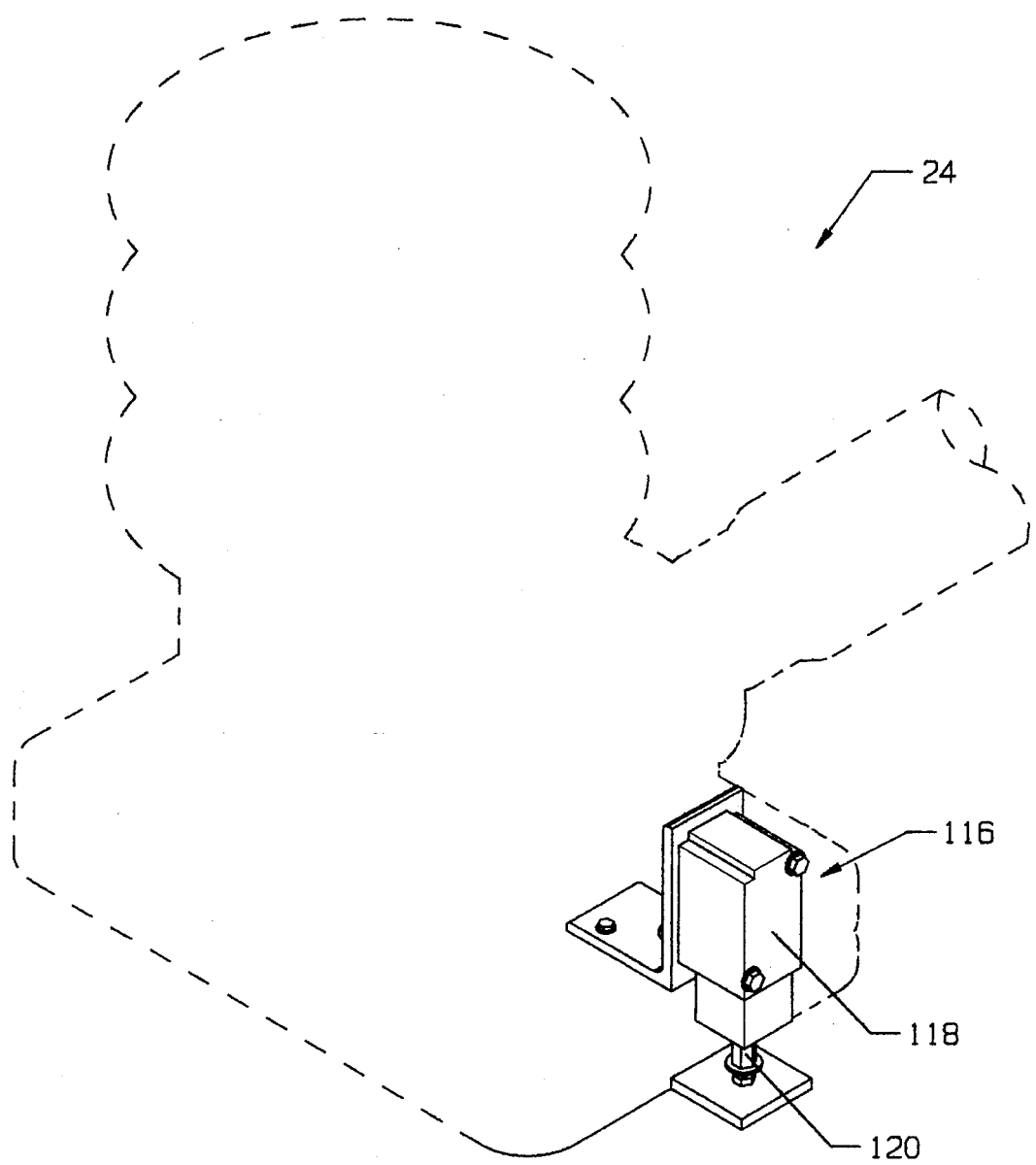
FIG. 9 is a perspective view of an electro-mechanical safety switch attached to each machine screw actuator of the drive assembly.

Referring to FIG. 9, the drive assemblies 20 for the elevator platforms 14, 16 each further include a plurality of electro-mechanical safety switches 116 which are attached to respective ones of the machine screw actuators 24 of the drive assembly 20. The safety switches 116 are operable to deactivate the drive motors 54 of a respective drive assembly 20 upon the failure of any one of the machine screw actuators 24. Each of the safety switches 116 comprises a main housing 118 which is attached to a respective gear box 32 and includes a plunger disposed therein which is pre-loaded via a pre-load adjuster 120 extending downwardly from the main housing 118. The failure of the gear box 32 or of one of the drive shafts connected to the actuation shaft 34 extending therethrough will cause the gear box 32 to elevate on a plurality of guide pins 33 which are used to facilitate the attachment of the gear box 32 to the base portion 26 of the machine screw actuator 24. When the plunger is properly preloaded, the elevation of the gear box 32 on the guide pins 33 actuates the safety switch 116 in a manner causing the same to generate an electrical signal which deactivates the drive motors 54, as will be discussed in more detail below.

Figure 10:
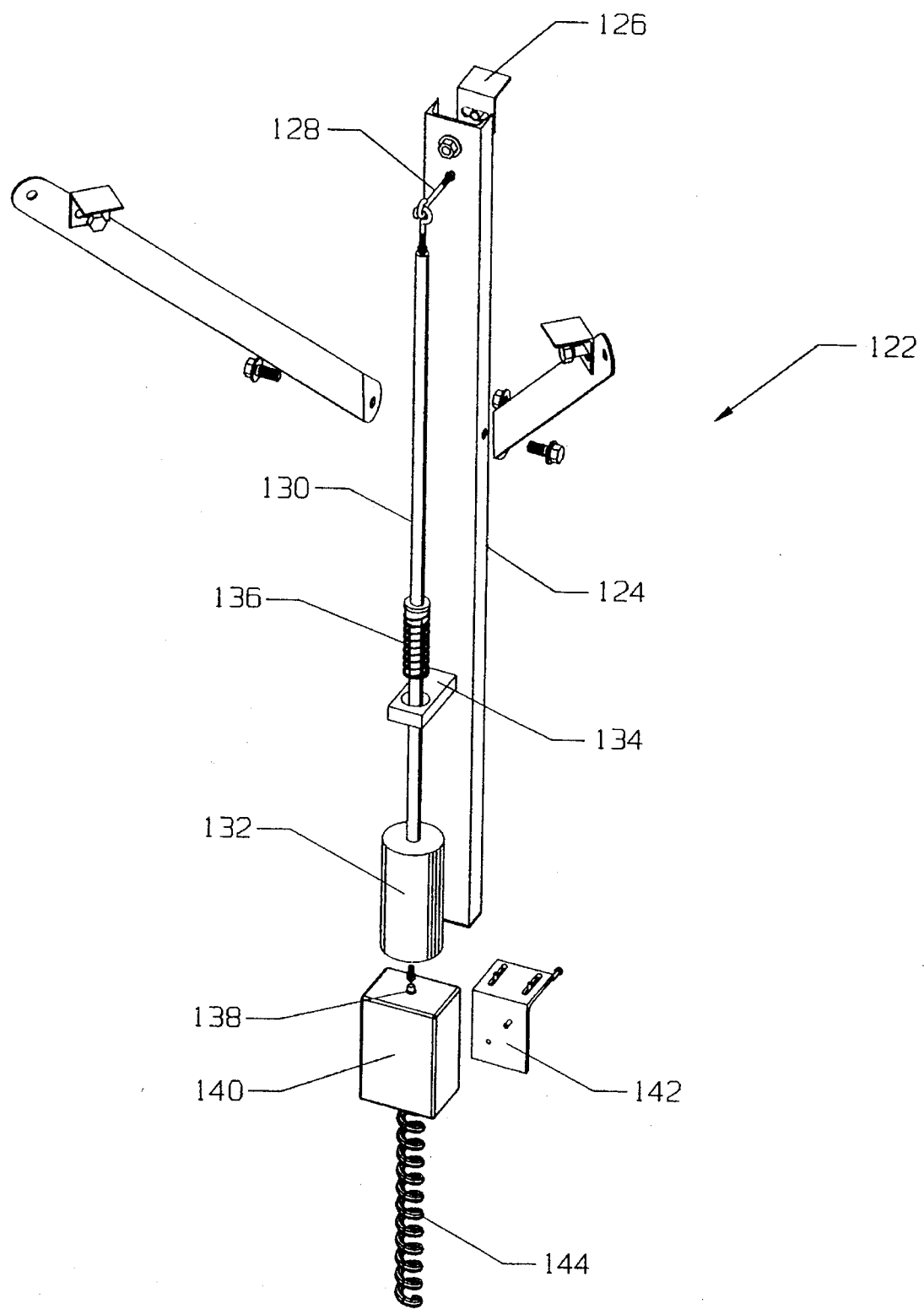
FIG. 10 is an exploded view of a level detector attached to each elevator platform of the elevation systems constructed in accordance with the first and second embodiments.

Referring now to FIG. 10, in addition to the safety switches 116, the drive assemblies 20 for the elevator platforms 14, 16 each include a level detector assembly 122 which is attached to a respective elevator platform 14, 16. The level detector assembly 122 is operable to deactivate the drive motors 54 of a respective drive assembly 20 in the event its associated elevator platform 14, 16 shifts out of parallel relation to the floor line. The level detector assembly 122 preferably comprises an elongate support channel 124 which is attached to the underside of a respective elevator platform 14, 16 via a bracket 126. Suspended from an eyebolt 128 extending laterally from the top end of the support channel 124 is an elongate pendulum arm 130 having a weight and target probe 132 attached to the bottom end thereof. The pendulum arm 130 is extended through the aperture of a flange 134 attached to and extending laterally from the lower middle portion of the support channel 124, and is maintained centrally there-within via a centering spring 136 positioned thereon.

As further seen in FIG. 10, the center of the weight and target probe 132 is coaxially aligned with the input terminal 138 of a sensor 140 which is attached to a sidewall of a respective elevator pit 22 via a bracket 142. The preferred spacing between the weight and target probe 132 and input terminal 138 of the sensor 140 is approximately 4 mm. Importantly, the displacement of an elevator platform 14, 16 in a manner causing the same to shift out of parallel relation to the floor line causes the pendulum arm 130, and hence the weight and target probe 132, of its associated level detector assembly 122 to swing out of axial alignment with the input terminal 138 of the sensor 140. Such movement causes the sensor 140 to generate an electrical signal through its sensor cord 144 which results in the immediate deactivation of the drive motors 54 of a respective drive assembly 20.

Figure 3:
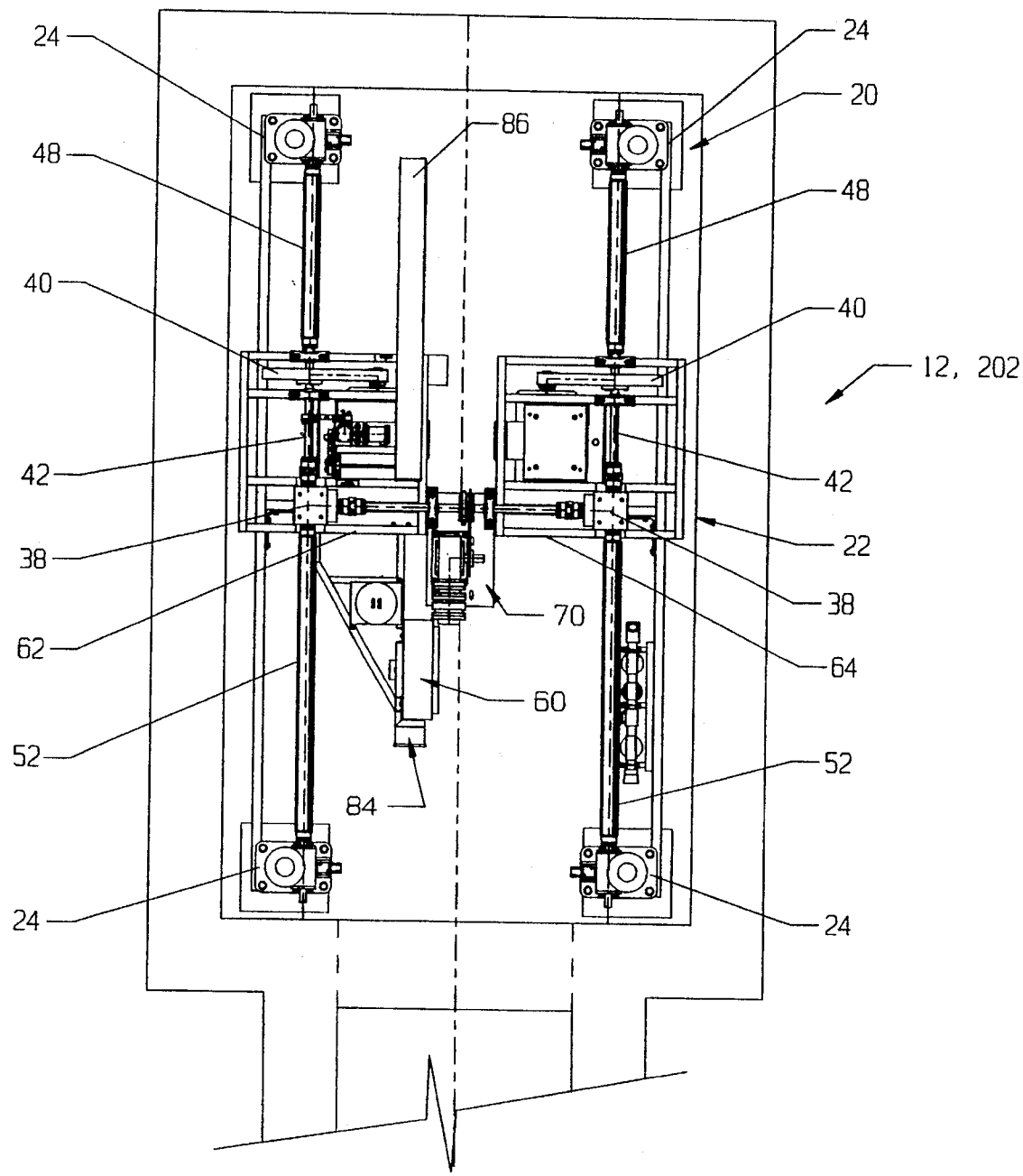
FIG. 3 is a top view of the drive assembly associated with the nose gear elevator platform included in the elevation systems constructed in accordance with the first and second embodiments of the present invention.
Figure 4:
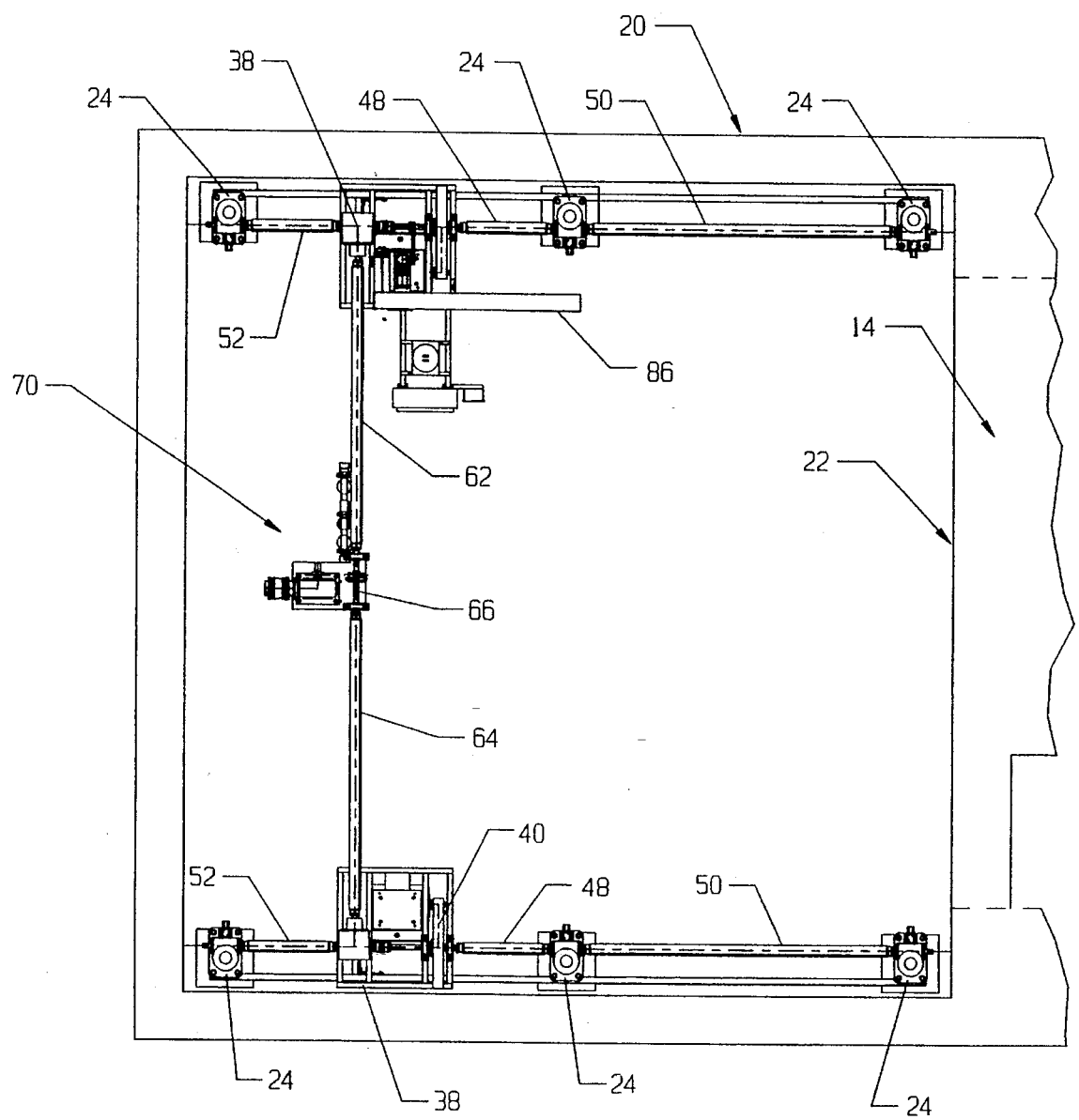
FIG. 4 is a top view of the drive assembly of the left wing gear elevator platform included in the elevation system constructed in accordance with the first embodiment.
Figure 4A:
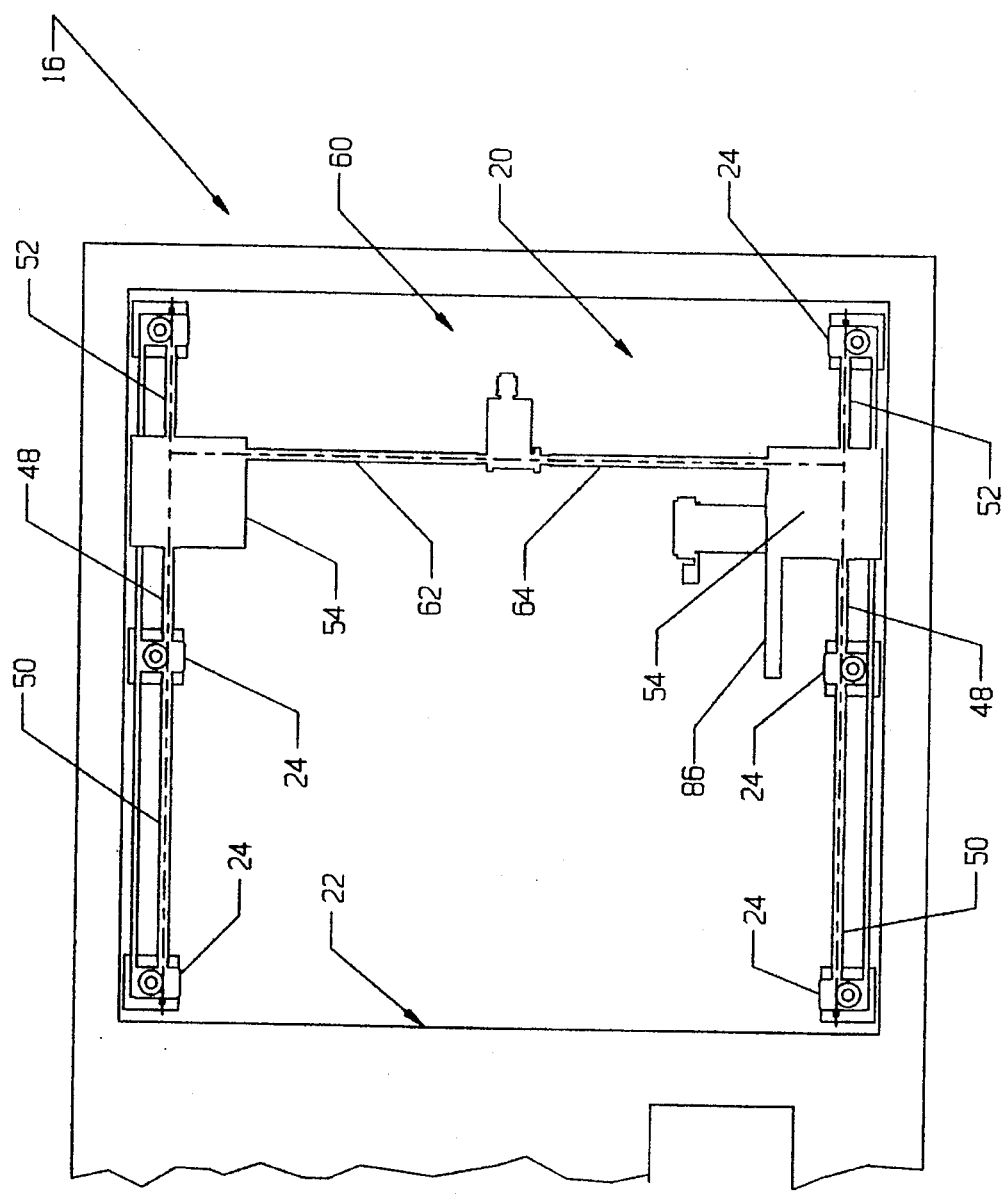
FIG. 4a is a top view of the drive assembly for the right wing gear elevator platform included in the elevation system constructed in accordance with the first embodiment.

Referring now to FIG. 3, the drive assembly 20 associated with the nose gear elevator platform 12 is substantially identical in structure and function to the drive assemblies 20 associated with the left and right wing gear elevator platforms 14, 16, but includes four (4) rather than six (6) machine screw actuators 24. The four machine screw actuators 24 are disposed in respective corners of the elevator pit 22 of the nose gear elevator platform 12. The primary differences between the remaining drive components of the drive assembly 20 for the nose gear elevator platform 12 and the drive assemblies 20 for the left and right wing gear elevator platforms 14, 16 are in the lack of the second drive shafts 50 which are eliminated due to the absence of the additional pair of machine screw actuators 24, and the size of the drive motors 54. In this respect, the drive motors 54 associated with the drive assembly 20 for the elevator platform 12 are each only 15 HP, rather than 30 HP as are the drive motors 54 of the drive assemblies 20 for the elevator platforms 14, 16. One further difference is in the lengths of the drive shafts 48, 52 and transverse shafts 62, 64. In this respect, the lengths of the drive shafts 48, 52 of the drive assembly 20 for the nose gear elevator platform 12 are slightly longer than the drive shafts 48, 52 of the drive assemblies 20 for the elevator platforms 14, 16, with the transverse shafts 62, 64 of the drive assembly 20 for the elevator platform 12 being significantly shorter than the transverse shafts 62, 64 of the drive assemblies 20 for the elevator platforms 14, 16. Despite these differences, the drive assembly 20 for the nose gear elevator platform 12 operates in an identical manner to the drive assemblies 20 for the elevator platforms 14, 16, with the auxiliary pneumatic drive system 70 and platform position monitoring system 86 thereof also functioning in a like manner.

Figure 11:
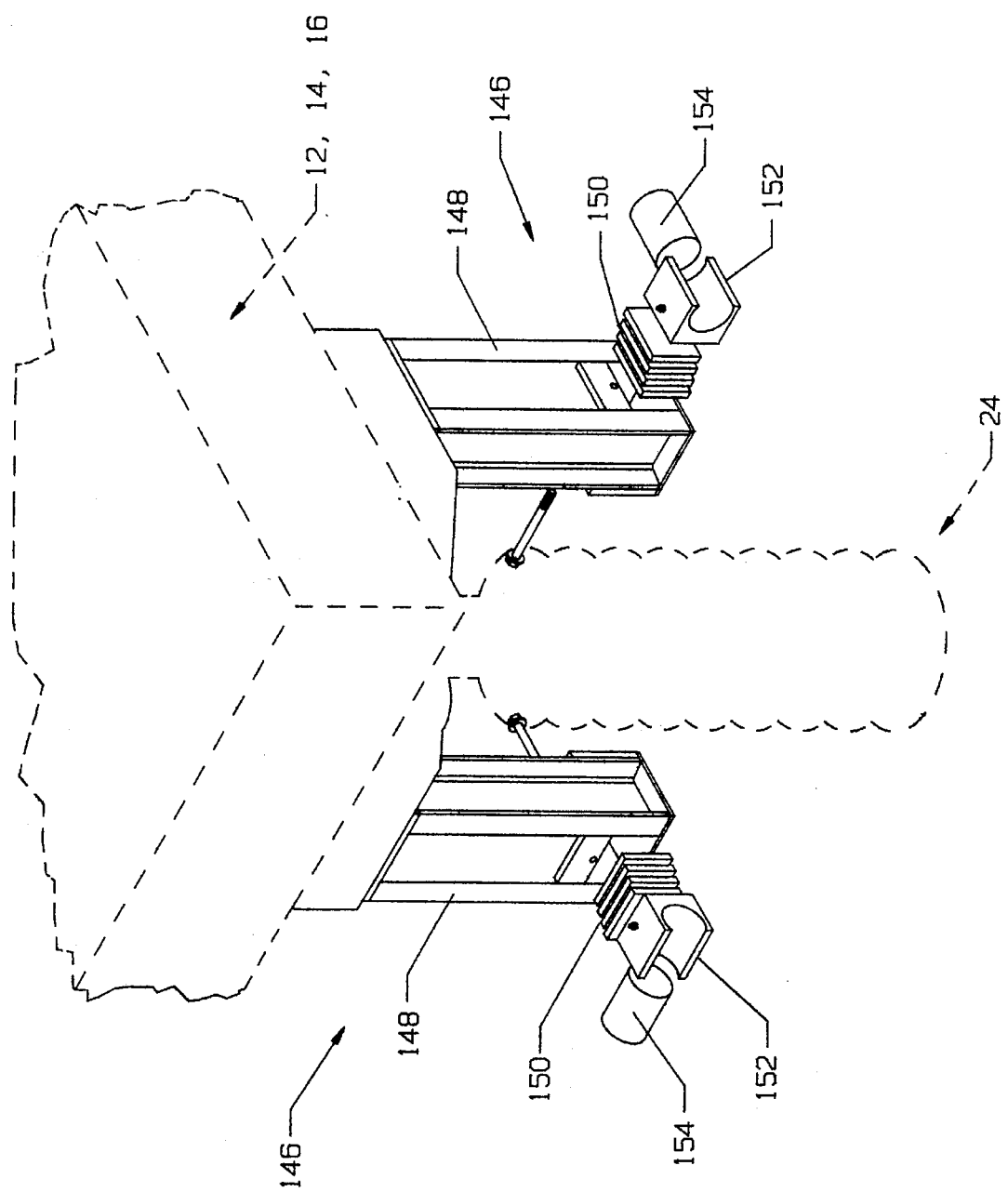
FIG. 11 is a partial perspective view illustrating the roller guides associated with each elevator platform.

Referring now to FIG. 11, the elevator platforms 12, 14, 16 are prevented from moving laterally or horizontally within a respective elevator pit 22 or relative the floor 18 by a plurality of guide assemblies 146. The guide assemblies 146 are attached to the underside of a respective elevator platform 12, 14, 16 in pairs which are disposed at each corner thereof. Each guide assembly 146 preferably comprises an elongate frame 148 which is attached to the underside of a respective elevator platform 12, 14, 16. Attached to the lower end of the frame 148 are one or more spacer members 150. Attached to the outermost spacer member 150 is a roller guide 152 which includes a roller 154 disposed therein. Importantly, the number of spacer members 150 incorporated into each of the guide assemblies 146 is selected so as to cause the roller member 154 to be in direct contact with one of the four sidewalls of the elevator pit 22. In this respect, as the elevator platforms 12, 14, 16 move upwardly and downwardly relative the floor 18, the rollers 154 roll upwardly and downwardly along the sidewalls of the elevator pits 22, with the guide assemblies 146 preventing any lateral or transverse movement of the elevator platforms 12, 14, 16 or their associated drive assemblies 20 within the elevator pits 22. The spacer members 156 are preferably fabricated from neoprene or a similar material to provide the guide assemblies 146, with some dampening and shock absorbing characteristics. Due to the inclusion of a pair of guide assemblies 146 at opposite sides of each corner, a total of eight (8) guide assemblies 146 are typically included with each elevator platform 12, 14, 16.

Figure 12:
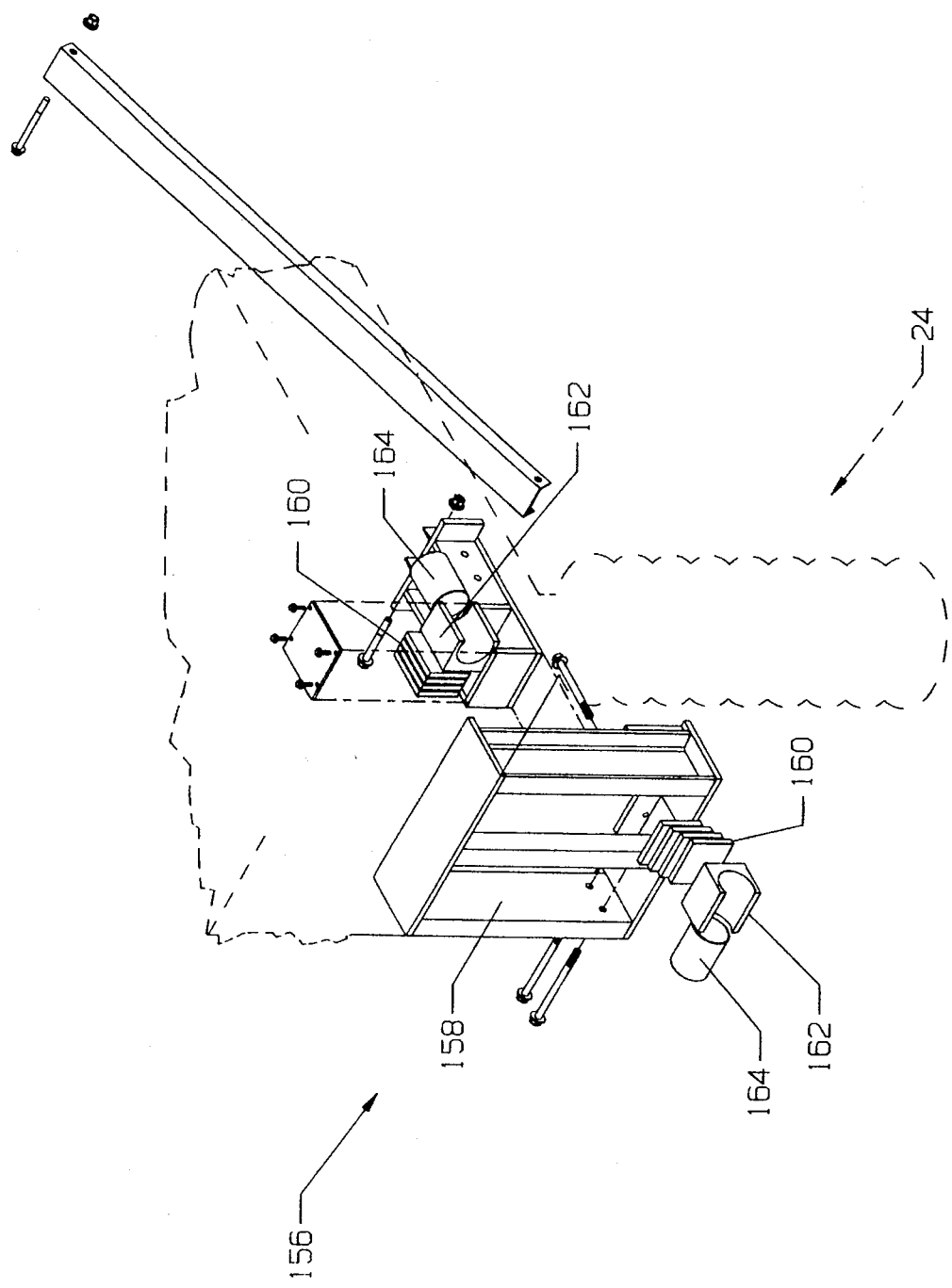
FIG. 12 is a partial perspective view illustrating an alternative embodiment of the roller guides associated with each elevator platform.
Figure 13:
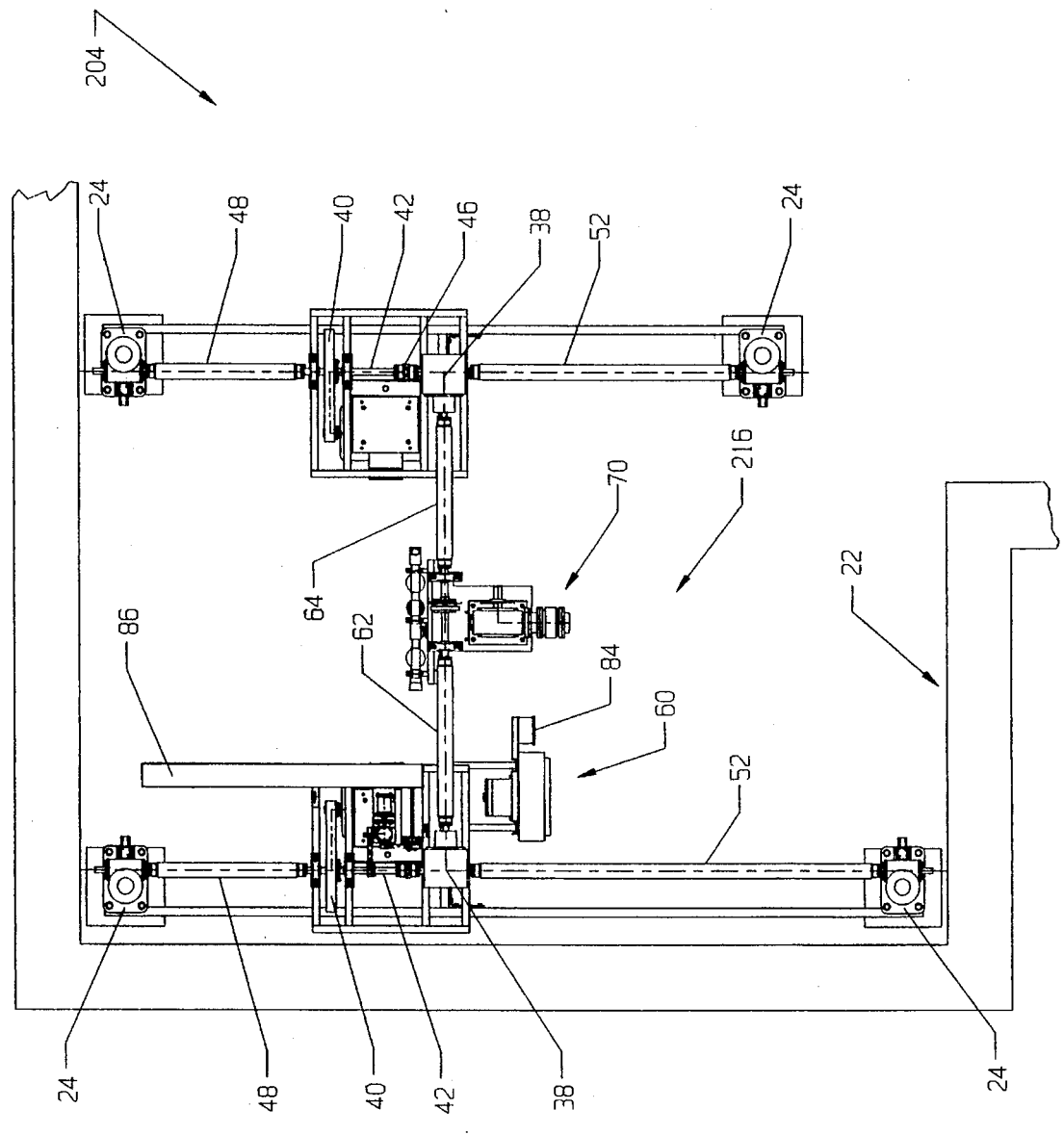
FIG. 13 is a top view of the drive assembly for the left wing gear elevator platform included in the elevation system constructed in accordance with the second embodiment.
Figure 13A:
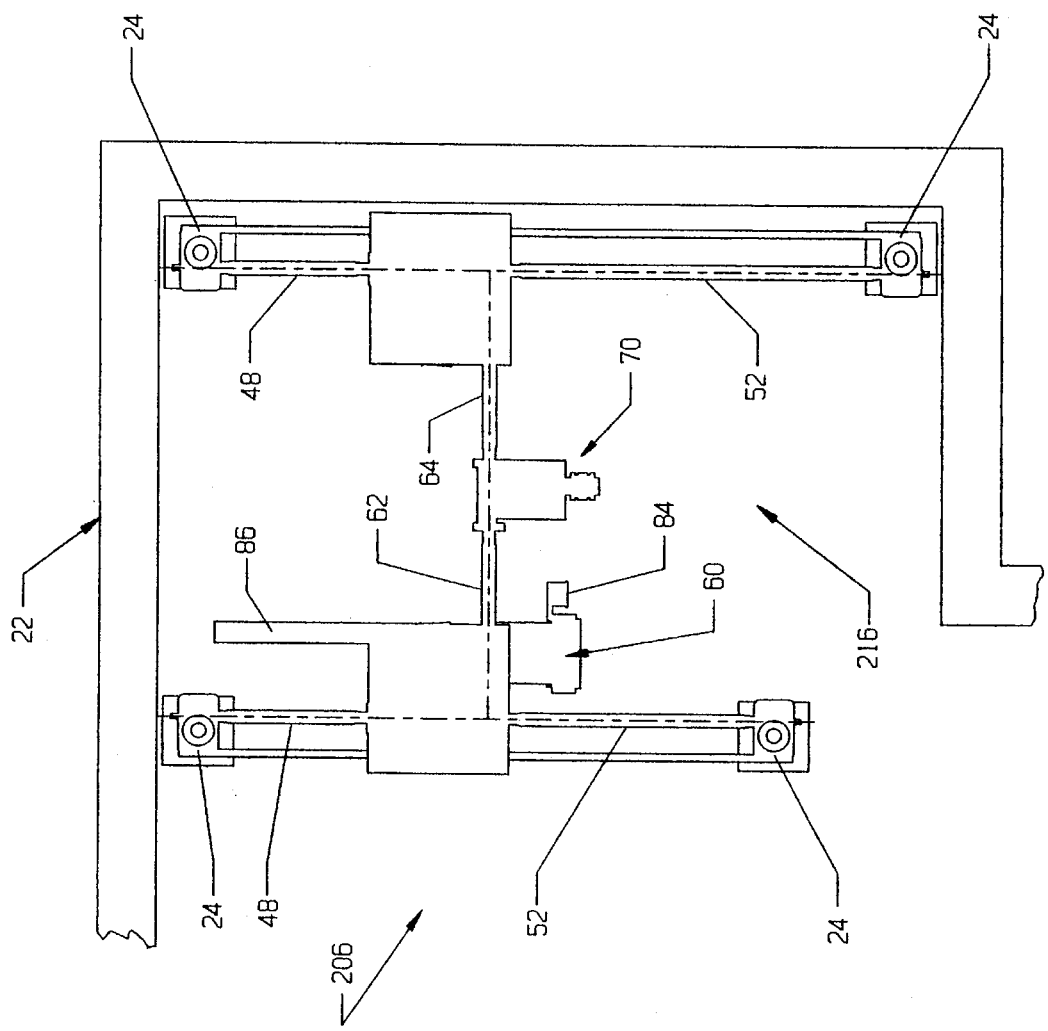
FIG. 13a is a top view of the drive assembly for the right wing gear elevator platform included in the elevation system constructed in accordance with the second embodiment.
Figure 14:
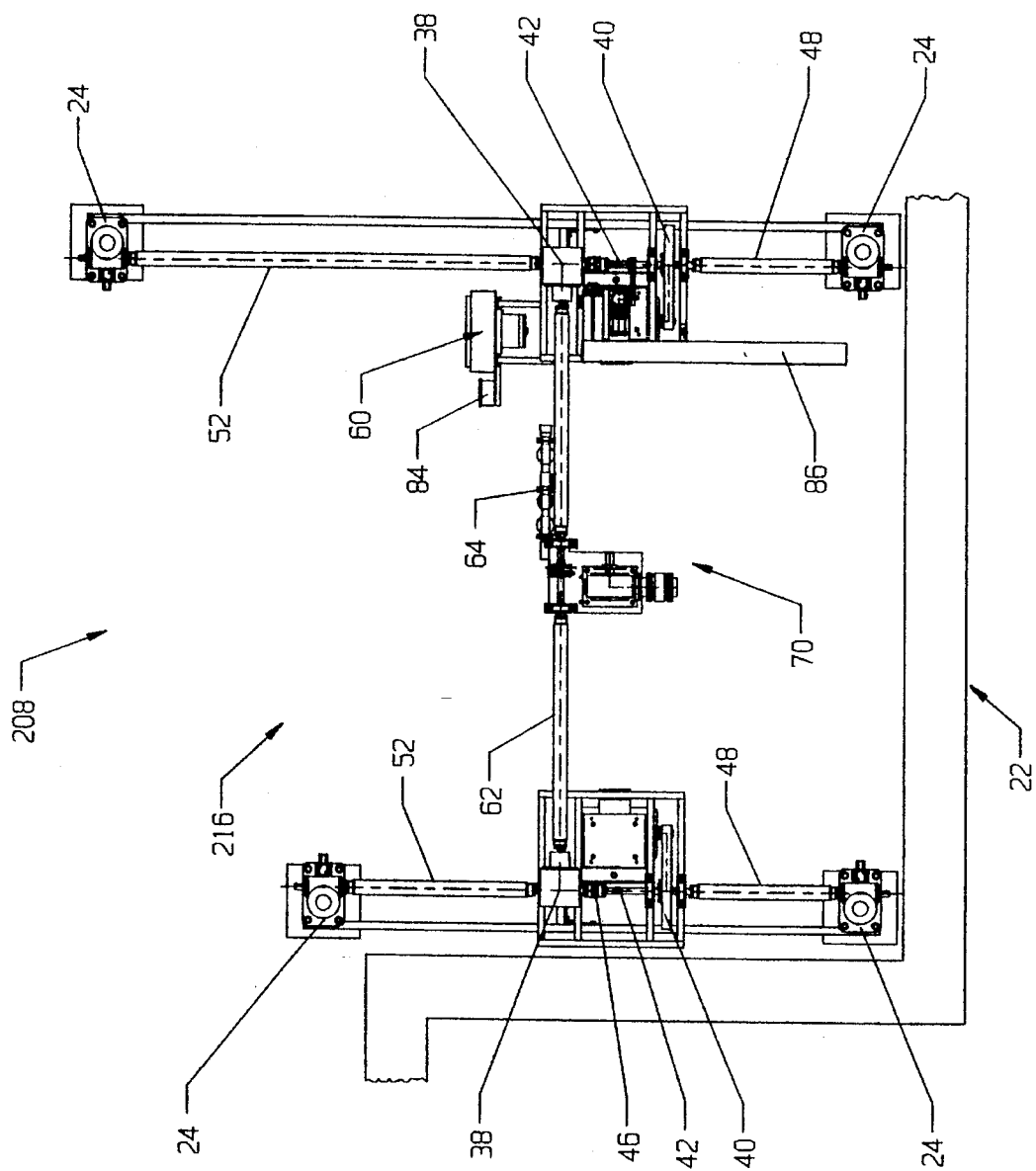
FIG. 14 is a top view of the drive assembly for the left body gear elevator platform included in the elevation system constructed in accordance with the second embodiment.
Figure 14A:
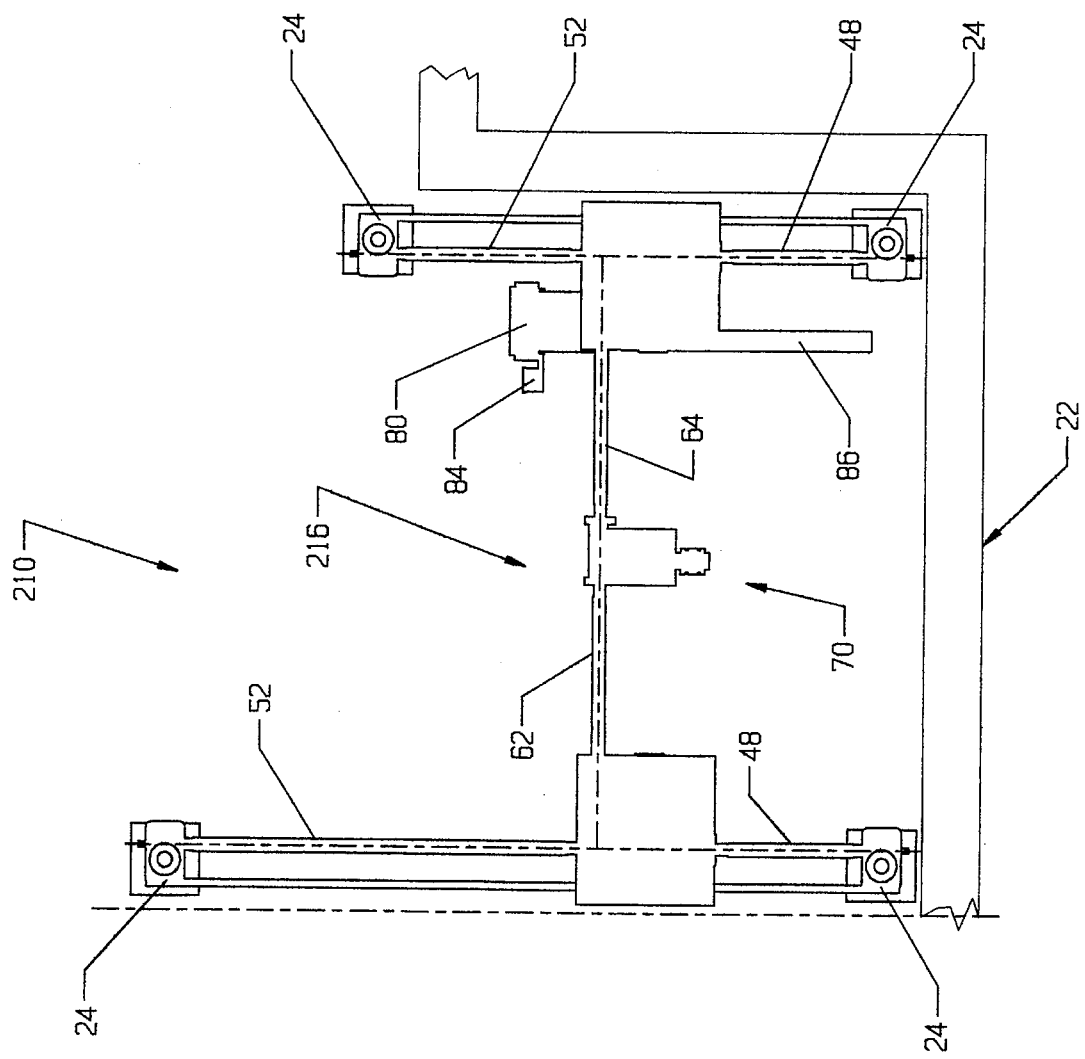
FIG. 14a is a top view of the drive assembly for the right body gear elevator platform included in the elevation system constructed in accordance with the second embodiment.
Figure 15:
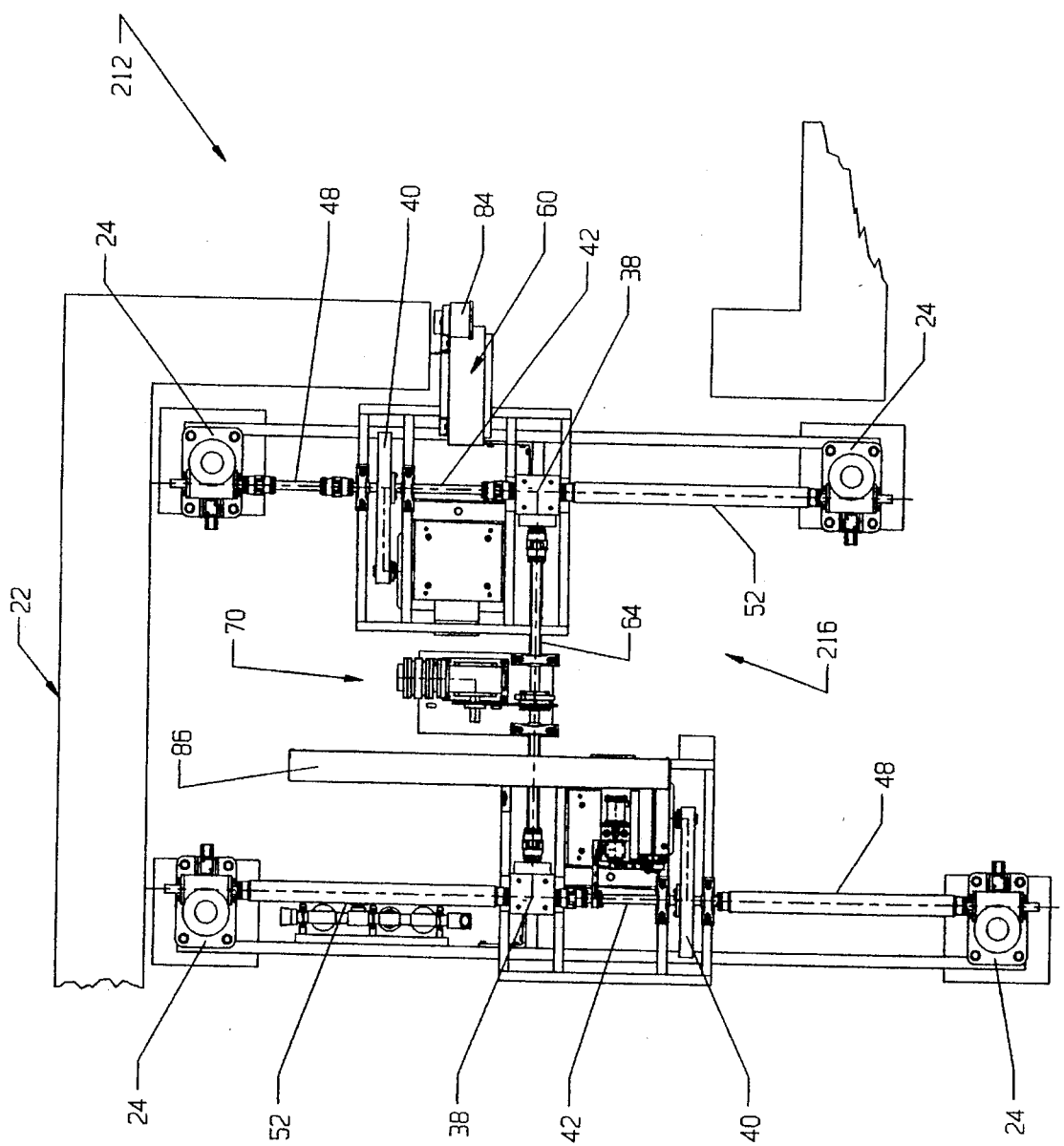
FIG. 15 is a top view of the drive assembly for the left auxiliary service elevator platform included in the elevation system constructed in accordance with the second embodiment.
Figure 15A:
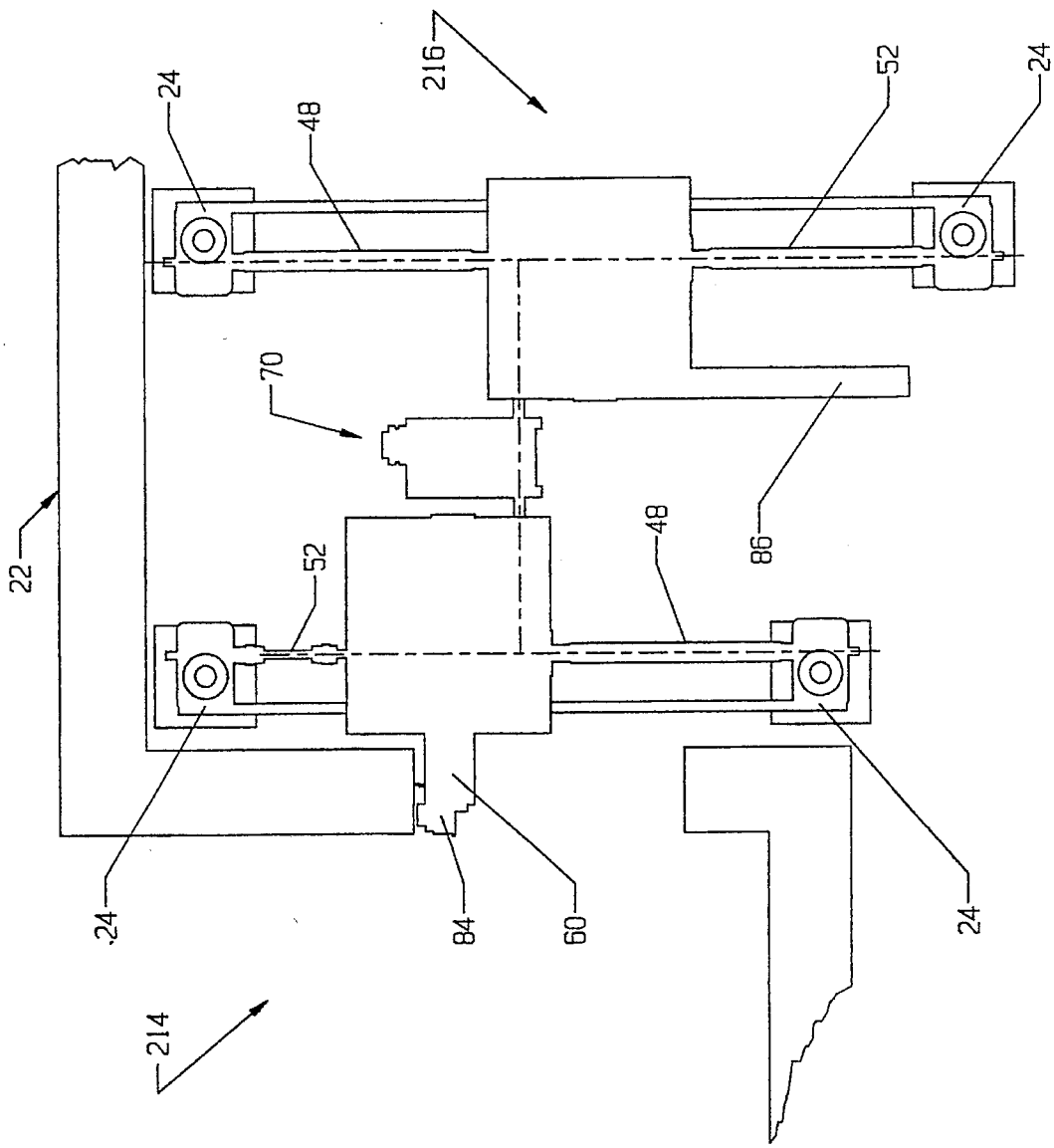
FIG. 15a is a top view of the drive assembly for the right auxiliary service elevator platform included in the elevation system constructed in accordance with the second embodiment.

Referring now to FIG. 12, the elevator platforms 12, 14, 16 may alternatively be provided with guide assemblies 156 which are substantially similar to the guide assemblies 146 previously described, but include frames 158 which are each configured to accommodate two sets of spacer members 160. Attached to the outermost spacer member 160 of each set is a roller guide 162 which includes a roller 164 disposed therein. The guide assemblies 156 function in the same manner as the guide assemblies 146 previously described, but provide additional lateral support to the elevator platforms 12, 14, 16 due to the inclusion of a total of sixteen (16) rollers 164 with each elevator platform 12, 14, 16, rather than the eight (8) rollers 154 as are provided with the utilization of the guide assemblies 146.

Figure 6B:
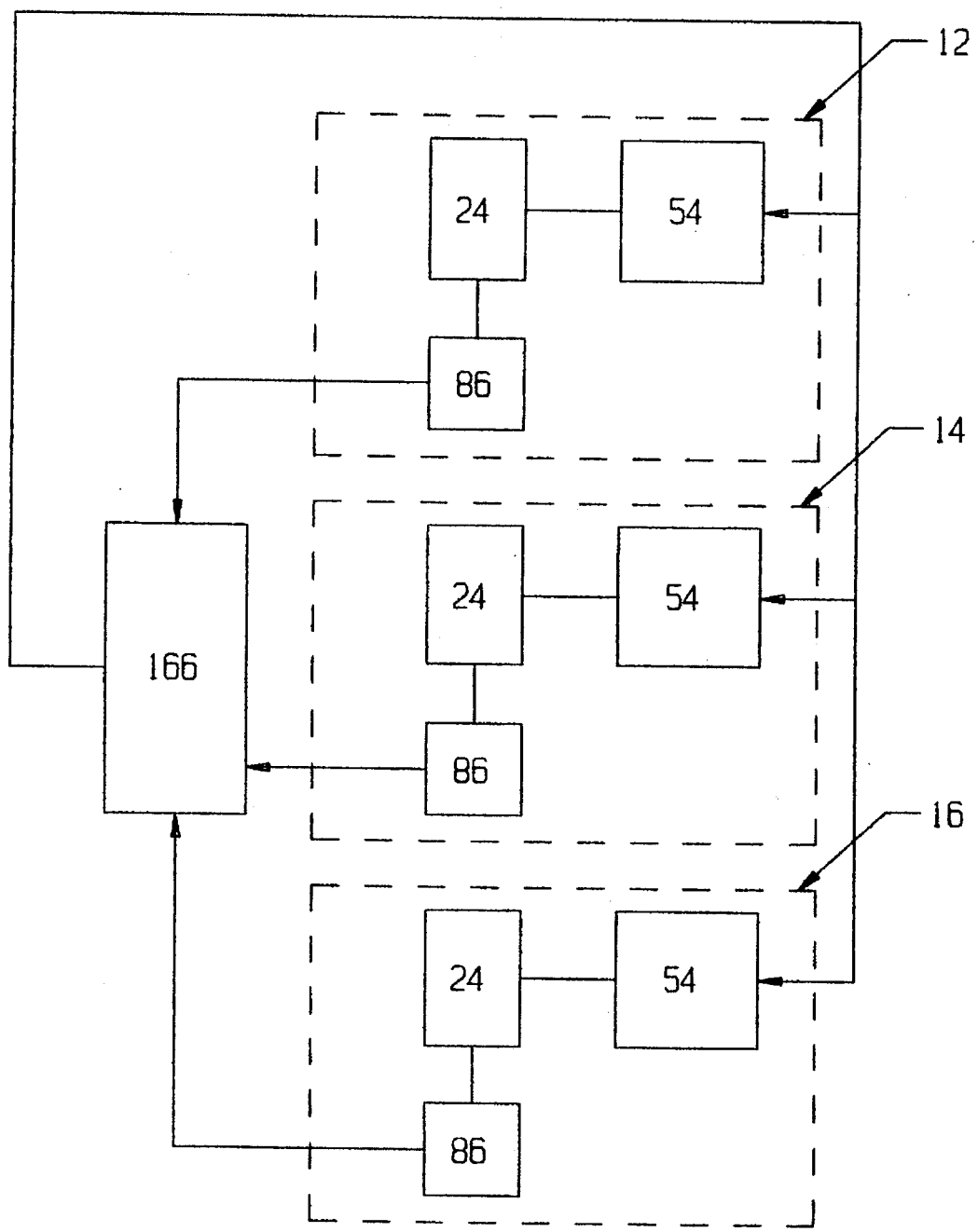
FIG. 6b is a schematic illustrating the electrical communication between the position monitoring systems and central processor of the elevation system constructed in accordance with the first embodiment.

Referring now to FIG. 6b, the elevation system 10 includes a remote central processor 166. Importantly, the platform position monitoring system 86 of each elevator platform 12, 14, 16, and in particular the optical encoder 89 thereof, is electrically connected to the central processor 166. Also electrically connected to the central processor 166 are the limit switches 114 and level detector assembly 122 associated with each elevator platform 12, 14, 16. The central processor 166 itself is electrically connected to the drive motors 54 associated with each drive assembly 20.

The operation of the elevation system 10 in the second or simultaneous mode is accomplished by actuating the by-pass and radio manual buttons 60e, 60f of each drive control terminal 60 to the off position. Thereafter, through the utilization of a hand-held radio transmitter, the central processor 166 may be caused to generate motor drive signals to the drive motors 54 of all three drive assemblies 20. The type of drive signal generated by the central processor 166 is dependent upon the desired direction of travel for the elevator platforms 12, 14, 16. In this respect, the central processor 166 may receive a radio signal input from the radio transmitter which causes the same to generate motor drive signals which energize the drive motors 54 in a manner facilitating the simultaneous upward vertical movement of the elevator platforms 12, 14, 16. Alternatively, the central processor 166 may receive a radio signal input from the radio transmitter which causes the same to generate motor drive signals which energize the drive motors 54 in a manner facilitating the simultaneous downward vertical movement of the elevator platforms 12, 14, 16.

Due to the electrical connection of the safety switches 116 of each of the drive assemblies 20 to the central processor 166, the failure of any machine screw actuator 24 of the elevation system 10 will cause an electrical signal to be generated by the corresponding safety switch 116 to the central processor 166. The receipt of such a signal by the central processor 166 will cause the same to immediately deactivate the drive motors 54 of each of the drive assemblies 20. Similarly, due to the electrical connection of each level detector assembly 122 to the central processor 166, the movement of any one of the elevator platforms 12, 14, 16 out of parallel relation to the floor line will cause an electrical signal to be generated by the corresponding level detector assembly 122 to the central processor 166. Upon the receipt of such a signal from a level detector assembly 122, the central processor 166 will immediately deactivate the drive motors 54 of the drive assemblies 20.

In the elevation system 10, the optical encoders 89 of the platform position monitoring systems 86 continuously monitor the position of a respective elevator platform 12, 14, 16. Importantly, each of the optical encoders 89 continuously transmits electrical signals representative of the position of a respective elevator platform 12, 14, 16 to the central processor 166. The central processor 166 is operable to compare the electrical signals generated by the optical encoders 89 and transmit motor drive signals to the drive motors 54 of the drive assemblies 20 which are based on the relative positions of the elevator platforms 12, 14, 16 to each other. Advantageously, these motor drive signals generated by the central processor 166 are adapted to regulate the operation of the drive motors 54 of each of the drive assemblies 20 as needed to maintain the elevator platforms 12, 14, 16 of the elevation system 10 in substantially co-planar relation to each other during the raising and lowering thereof when the elevation system 10 is operated in the simultaneous mode.

Figure 2:
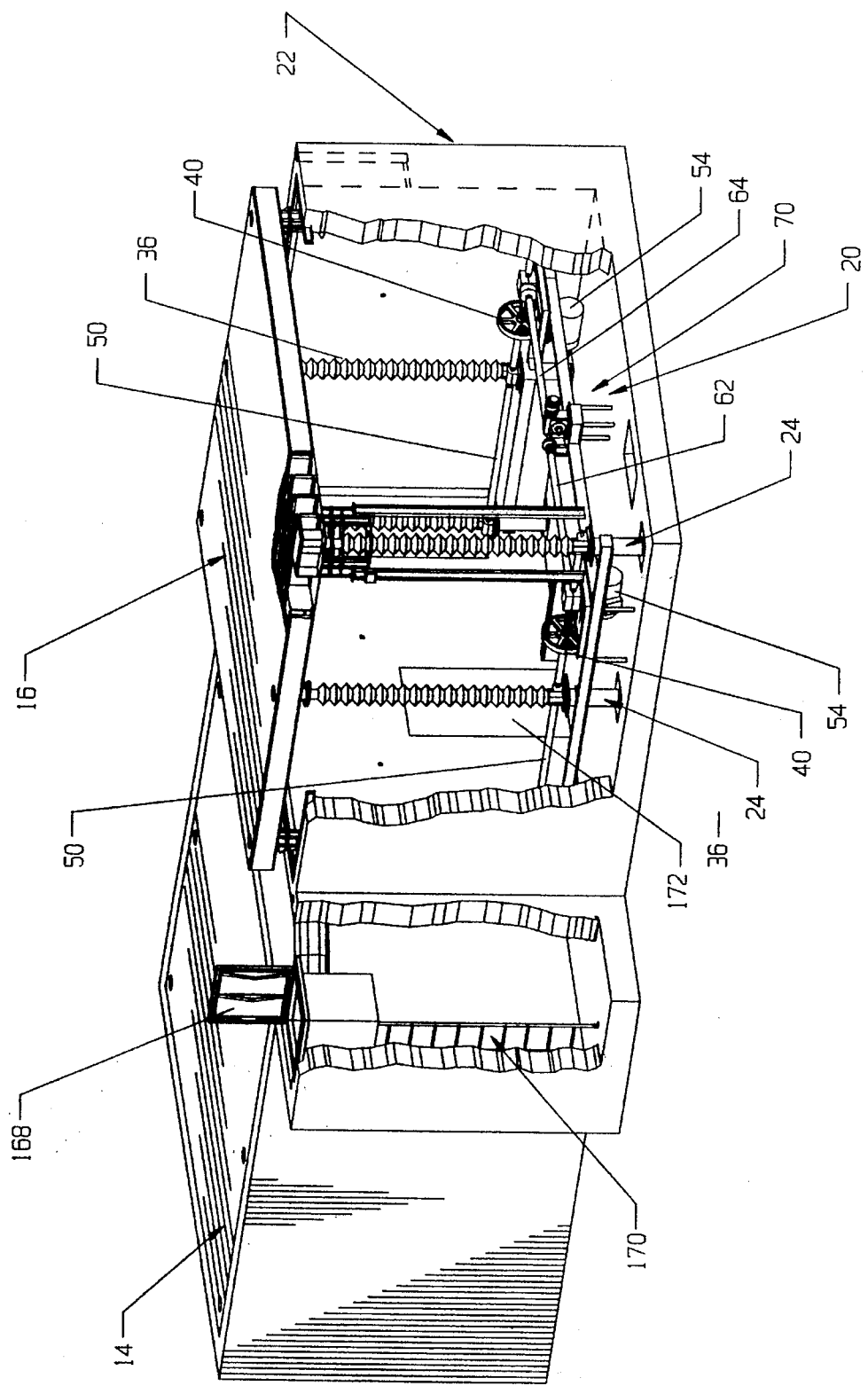
FIG. 2 is a partial perspective view illustrating one of the elevator pits of the elevation systems shown in FIGS. 1 and 1a and drive assembly disposed therein for facilitating the raising and lowering of the elevator platform.

In the event operation of the elevation system 10 is desired in the first or independent mode, the bypass button 60e of the drive control terminal 60 of each drive assembly 20 is actuated to the on position. If it is desired to independently control a respective elevator platform 12, 14, 16 via the previously described hand-held radio transmitter, the radio manual button 60f of its drive control terminal 60 is actuated to the on position subsequent to the actuation of the bypass button 60e to the on position. If the radio manual button 60f is maintained in the off position, the raising and lowering of the elevator platform is conducted via the selective actuation of the manual up and down buttons 60b, 60c of its drive control terminal 60. As best seen in FIG. 2, the drive control terminals 60 of the drive assemblies 20 associated with the left and right wing gear elevator platforms 14, 16 are accessed via a trap door 168 which is disposed in the floor 18 of the maintenance hanger. A ladder 170 extending downwardly from the trap door 168 allows an operator to enter either of the elevator pits 22 associated with the elevator platforms 14, 16 via doorways 172 which lead to a common hallway extending therebetween. Though not shown, the elevator pit 22 associated with the nose gear elevator platform 12 is accessed in a similar manner, i.e., via a trap door and ladder arrangement.

In the event any one of the drive assemblies 20 associated with the elevator platforms 12, 14, 16 fails, its auxiliary pneumatic drive system 70 may be activated to return the elevator platform to floor level. The drive control units 84 for the auxiliary pneumatic drive systems 70 are accessed in the same manner as the drive control terminals 60 since they are disposed in the elevators pits 22 immediately adjacent to the drive control terminals 60. Upon the failure of a drive assembly 20, the on/off switch 84a of the related drive control unit 84 is switched to the on position, with the raising or lowering of the associated elevator platform 12, 14, 16 being conducted via the selective manipulation of the up and down buttons 84d, 84e.

Figure 1A:
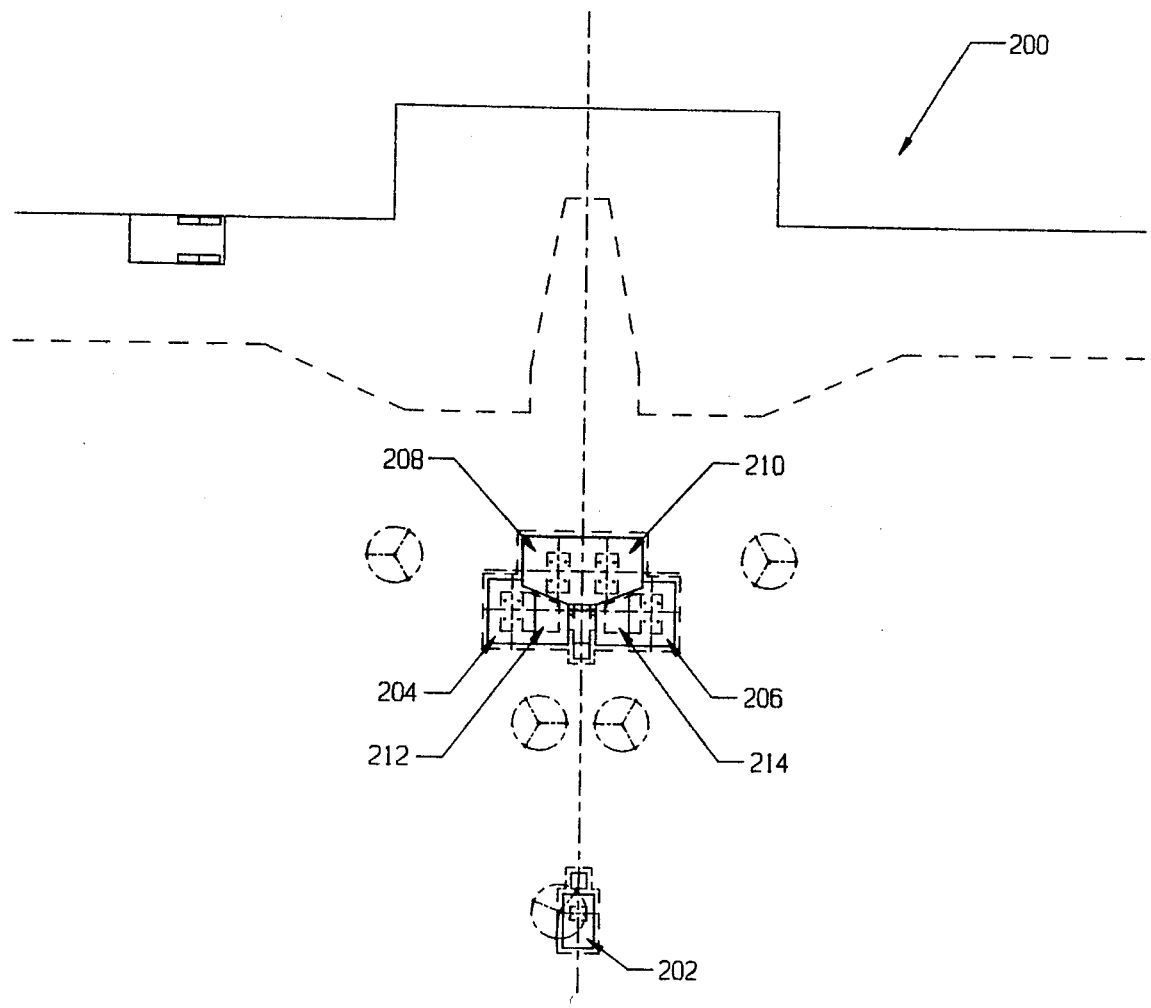
FIG. 1a is a top view of an aircraft maintenance elevation system constructed in accordance with a second embodiment of the present invention.

Referring now to FIG. 1a, illustrated is a top view of an aircraft maintenance elevation system 200 constructed in accordance with a second embodiment of the present invention. In the second embodiment, the elevation system 200 is designed to service the BOEING 747 aircraft. The elevation system 200 comprises a nose gear elevator platform 202, a left wing gear elevator platform 204, a right wing gear elevator platform 206, a left body gear elevator platform 208, a right body gear elevator platform 210, a left auxiliary service elevator platform 212 and a right auxiliary service elevator platform 214. Each of the elevator platforms 202–214 defines a planer top surface which is continuous with the floor 18 of the maintenance hanger when the aircraft is initially brought in for servicing. Like the elevation system 10 previously described, the elevation system 200 is operational in a first mode wherein the elevator platforms 202–210 may be controlled (i.e., raised and lowered) independently of each other, and a second, synchronized mode wherein they may be simultaneously raised and lowered.

The left and right auxiliary service elevator platforms 212, 214 are operated independently of the remaining elevator platforms of the elevation system 200.

As will be recognized, the layout of the elevator platforms 202–210 upon the floor 18 of the aircraft maintenance hanger coincides with the positions of the landing gear trucks upon the BOEING 747 aircraft. The left and right wing gear elevator platforms 204, 206 are identically configured and have a preferred length of 16 feet 8 inches and a preferred width of 12 feet 2 inches. The total vertical travel capability of the left and right wing gear elevator platforms 204, 206 is 102 3/8 inches, with 78 3/4 inches of such travel being below floor level and 23 5/8 inches being above floor level. The load bearing capacity of the left and right wing gear elevator platforms 204, 206 is 70 tons on an operational basis and 110 tons on a rollover basis.

The left and right body gear elevator platforms 208, 210 are also identically configured and have a preferred length of 17 feet 3 inches and a preferred width of 14 feet 6 inches. The total vertical travel capability of the left and right body gear elevator platforms 208, 210 is also 102 3/8 inches, with 78 3/4 inches of such travel being below floor level and 23 5/8 inches being above floor level. The load bearing capacity of the left and right body gear elevator platforms 208, 210 is 70 tons on an operational basis and 110 tons on a rollover basis.

The nose gear elevator platform 202 is configured identically to the nose gear elevator platform 12 previously described in relation to the elevation system 10 and has a preferred length of 14 feet and a preferred width of 8 feet. The total vertical travel capability of the nose gear elevator platform 202 is also 102 3/8 inches, with 78 3/4 inches of such travel being below floor level and 23 5/8 inches being above floor level. The load bearing capacity of the nose gear elevator platform 202 is 30 tons on an operational basis and 110 tons on a rollover basis.

The left and right auxiliary service elevator platforms 212, 214 are identically configured and have a preferred length of 17 feet 3 inches and a preferred width of 14 feet 6 inches. The total vertical travel capability of the left and right auxiliary service elevator platforms 212, 214 is 78 3/4 inches, with the entire length of such travel being below floor level. In this respect, neither the left or right auxiliary service elevator platforms 212, 214 is raiseable above floor level. The load bearing capacity of the left and right auxiliary service elevator platforms 212, 214 is 30 tons on an operational basis and 110 tons on a rollover basis.

Referring now to FIGS. 3 and 13–15a, each of the elevator platforms 202–214 is supported by a drive assembly 216 which is located in the bottom of a respective one of the elevator pits 22 associated with the elevator platforms. As will be recognized, the raising and lowering of the elevator platforms 202–214 is accomplished by the drive assemblies 216 upon which they are supported. The drive assembly 216 associated with the nose gear elevator platform 202 is identically configured to and functions in the same manner as the drive assembly 20 previously described in relation to the nose gear elevator platform 12 of the elevation system 10.

The drive assemblies 216 associated with the left and right wing gear elevator platforms 204, 206 are identically configured, mirror images of each other, and substantially identical in structure and function to the drive assembly 216 associated with the nose gear elevator platform 202. The primary differences between the drive assemblies 216 for the elevator platforms 204, 206 and the drive assembly 216 for the elevator platform 202 are in the size of the drive motors 54 and lengths of at least one of the drive shafts 52 and the first and second transfer shafts 62, 64. In this respect, the drive assembly 216 for the nose gear elevator platform 202 includes two (2) 15 HP drive motors 54 rather than the 30 HP drive motors 54 included in the drive assemblies for the elevator platforms 204, 206.

The drive assemblies 216 associated with the left and right body gear elevator platforms 208, 210 are also identically configured, mirror images of each other, and substantially identical in structure and function to the drive assemblies 216 associated with the left and right wing gear elevator platforms 204, 206. The drive assemblies 216 associated with the left and right auxiliary service elevator platforms 212, 214 are also identically configured, mirror images of each other, and substantially identical in structure and function to the drive assemblies 216 associated with the left and right wing gear elevator platforms 204, 206. The primary structural differences between the drive assemblies 216 for the elevator platforms 212, 214 and those associated with the elevator platforms 204, 206 are in the lengths of the drive shafts 48, 52 and transfer shafts 62, 64, and size of the drive motors 54 which are 10 HP in the drive assemblies 216 for the elevator platforms 212, 214 (rather than 30 HP). Additionally, since the elevator platforms 212, 214 travel only below floor level, the limit switches 114 associated with their positioning monitoring systems 86 are arranged so as to prevent any vertical travel above floor level.

Additional modifications and improvements of the present invention may also be apparent to those skilled in the art. Thus, particular combinations of parts described and illustrated herein are intended to represent only certain embodiments of the present invention and are not intended to serve as limitations of alternative devices within the spirit and scope of the invention.

What is claimed is:

1. An aircraft maintenance elevator system comprising:

a plurality of elevator platforms;

a plurality of electro-mechanical drive assemblies, each of said drive assemblies being coupled to and operable to selectively raise and lower a respective one of said elevator platforms and comprising:

a plurality of machine screw actuators attached to a respective one of said elevator platforms and mechanically synchronized to maintain the elevator platform level throughout the operational sequence thereof; and at least two reversible electric drive motors having drive shafts which are mechanically coupled to said machine screw actuators;

wherein the rotation of the drive shafts in a first direction causes the machine screw actuators to raise the elevator platform and the rotation of the drive shafts in a second direction causes the machine screw actuators to lower the elevator platform;

a control device electrically connected to said drive assemblies, said control device being operational in a first mode wherein said elevator platforms may be raised and lowered independently of each other and a second mode wherein said elevator platforms may be simultaneously raised and lowered.

2. The system of claim 1 comprising:

a right wing gear elevator platform;

a left wing gear elevator platform; and a nose gear elevator platform.

3. The system of claim 1 comprising:

a right wing gear elevator platform;

a left wing gear elevator platform;

a right body gear elevator platform;

a left body gear elevator platform; and a nose gear elevator platform.

4. The system of claim 3 further comprising:

a right service elevator platform; and a left service elevator platform.

5. The system of claim 1 wherein each of said drive assemblies further comprises an auxiliary pneumatic drive system mechanically coupled to said machine screw actuators and operable to move the elevator platform to floor level upon the failure of any one or more of the drive motors.

6. The system of claim 1 wherein each of said drive assemblies further comprises an auxiliary manual electric drive system electrically connected to said drive motors for manually raising and lowering the elevator platform.

7. The system of claim 1 wherein each of said drive assemblies further comprises a platform position monitoring system mechanically coupled to at least one of said drive motors and operable to stop the drive motors when the elevator platform is at floor level, at a lower position limit below floor level, and at an upper position limit above floor level.

8. The system of claim 1 wherein each of said drive assemblies further comprises a plurality of electro-mechanical safety switches attached to respective ones of said machines screw actuators and electrically connected to said drive motors, said safety switches being operable to deactivate said drive motors upon the failure of any one of said machine screw actuators.

9. The system of claim 1 wherein each of said drive assemblies further comprises a level detector attached to said elevator platform and electrically connected to said drive motors, said level detector being operable to deactivate the drive motors upon the elevator platform shifting out of a desired plane.

10. The system of claim 7 wherein said control device comprises:

a central processor electrically connected to the drive motors and position monitoring system of each of said drive assemblies;

each of said position monitoring systems continuously sensing the position of a respective elevator platform and transmitting an electrical signal representative of the elevator platform position to the central processor, said central processor being operable to compare the electrical signals generated by the position monitoring systems and transmit motor drive signals based on the relative positions of the elevator platforms which regulate the operation of the drive motors of each of the drive assemblies as needed to maintain the elevator platforms in substantially co-planar relation to each other during the raising and lowering thereof when said control device is operated in said second mode.

* * * * *